(12) United States Patent
Tanimoto et al.

(10) Patent No.: US 6,698,217 B2
(45) Date of Patent: Mar. 2, 2004

(54) FREEZING DEVICE

(75) Inventors: Kenji Tanimoto, Osaka (JP); Masaaki Takegami, Osaka (JP); Takeo Ueno, Osaka (JP); Kazuyoshi Nomura, Osaka (JP); Akihiro Kajimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/362,625

(22) PCT Filed: Jun. 25, 2002

(86) PCT No.: PCT/JP02/06373

§ 371 (c)(1),
(2), (4) Date: Feb. 24, 2003

(87) PCT Pub. No.: WO03/001129

PCT Pub. Date: Jan. 3, 2003

(65) Prior Publication Data

US 2003/0233836 A1 Dec. 25, 2003

(30) Foreign Application Priority Data

Jun. 26, 2001  (JP) ..................................... 2001-192702

(51) Int. Cl.⁷ ................................................ F25B 7/00
(52) U.S. Cl. ........................................ 62/175; 62/570
(58) Field of Search ............................... 62/175, 196.2, 62/228.5, 510

(56) References Cited

U.S. PATENT DOCUMENTS

| | | | | | |
|---|---|---|---|---|---|
| 4,184,341 A | * | 1/1980 | Friedman | ..................... | 62/175 |
| 4,209,996 A | * | 7/1980 | Shaw | ..................... | 62/175 |
| 4,259,847 A | * | 4/1981 | Pearse, Jr. | ..................... | 62/93 |
| 5,103,650 A | * | 4/1992 | Jaster | ..................... | 62/198 |
| 5,996,363 A | * | 12/1999 | Kurachi et al. | ..................... | 62/192 |
| 6,003,323 A | * | 12/1999 | Sumida et al. | ..................... | 62/175 |
| 6,131,401 A | * | 10/2000 | Ueno et al. | ..................... | 62/175 |
| 6,185,946 B1 | * | 2/2001 | Hartman | ..................... | 62/175 |

FOREIGN PATENT DOCUMENTS

| | | | |
|---|---|---|---|
| JP | 6-221698 A | | 8/1994 |
| JP | 10-246526 A | | 9/1998 |
| JP | 11-14123 A | | 1/1999 |
| JP | 2974381 B2 | | 9/1999 |
| JP | 6-257889 A | | 3/2001 |
| JP | 2002286316 A | * | 10/2002 |
| JP | 02002357374 A | * | 12/2002 |

\* cited by examiner

Primary Examiner—William C. Doerrler
Assistant Examiner—Mohammad M. Ali
(74) Attorney, Agent, or Firm—Nixon Peabody LLP; Donald R. Studebaker

(57) ABSTRACT

An object of the present invention is to continue operation as it is without inducing any degradation of performance of a compressor even if one of compressors is broken down in a refrigeration apparatus which can freely cool or warm the inside of a room, cool a refrigerating show case and cool a freezing show case. A refrigeration apparatus (1) comprises a non-inverter compressor (2A), a first inverter compressor (2B) and a second inverter compressor (2C). If the first inverter compressor (2B) is broken down during a cooling/freezing operation in which a cooling operation is performed by an inside heat exchanger (41), a refrigerating heat exchanger (45) and a freezing heat exchanger (51), the operation is continued by opening a solenoid valve (7a) disposed on a first sub pipe (23).

8 Claims, 20 Drawing Sheets

FREEZING DEVICE

TECHNICAL FIELD

The present invention relates to a refrigeration apparatus and, more particularly, to a refrigeration apparatus provided with an air-conditioning heat exchanger and a cooling heat exchanger.

BACKGROUND ART

A refrigeration apparatus has been conventionally used widely as an air conditioner for cooling or warming a room, or a cooler for a refrigerant for stocking foods and the like therein. There has also been a refrigeration apparatus for performing both of air-conditioning and freezing, as disclosed in WO 98/45651. The refrigeration apparatus of this type is installed at a place at which both of air-conditioning and freezing are required, for example, at a convenience store or the like, and it is provided with a plurality of compressors and a plurality of heat exchangers on a using side such as an air-conditioning heat exchanger and a refrigerating heat exchanger. Therefore, both of the air-conditioning inside the store and the cooling of a show case or the like can be achieved by the use of the single refrigeration apparatus of this type.

However, in the case where either one of the compressors is broken down in the conventional refrigeration apparatus, there has been a tendency of the degradation of either one of the air-conditioning heat exchanger and the refrigerating heat exchanger or of the entire degradation of both of the heat exchangers.

In view of this, a demand has been increased for a refrigeration apparatus, in which operation can be continued as it is without inducing excessive degradation even if one of the compressors is broken down.

In general, it is more important to maintain the freezing performance than to maintain the air-conditioning performance in the usage requiring both of the air-conditioning and the freezing. This is because the degradation of the air-conditioning performance merely induces an uncomfortable feeling of a resident but the degradation of the freezing performance leads to the degradation of a quality of an object to be cooled (e.g., frozen foods and the like). However, the conventional refrigeration apparatus has not been configured such that the operation is changed so as to secure the freezing performance when the compressor is broken down. Therefore, there has been a demand for a refrigeration apparatus in which the operation can be continued while securing the freezing performance even if one of the compressors is broken down.

The present invention has been accomplished to solve the above-described problems experienced by the prior art. An object of the present invention is to provide a refrigeration apparatus in which operation can be continued as it is even if one of compressors is broken down.

DISCLOSURE OF THE INVENTION

A first refrigeration apparatus comprises: a refrigerant circuit including first, second and third compressors juxtaposed to each other, a heat exchanger on the side of a heat source, an air-conditioning heat exchanger for air-conditioning the inside of a room, cooling heat exchangers for cooling the insides of a refrigerator and a freezer, and a first expanding mechanism and second expanding mechanisms for expanding a refrigerant; and breakdown detecting means for detecting the breakdown of at least the second compressor; the refrigeration apparatus being capable of freely performing at least a cooling operation and a freezing operation, wherein the cooling operation is performed by actuating the second compressor and the third compressor, the cooling operation being achieved by condensing a refrigerant discharged from the second compressor and the third compressor by means of the heat exchanger on the side of the heat source, expanding it by the first expanding mechanism, evaporating it by the air-conditioning heat exchanger, and returning it to the second compressor and the third compressor, and further, the freezing operation is performed by actuating the first compressor and the second compressor, the freezing operation being achieved by condensing a refrigerant discharged from the first compressor and the second compressor by means of the heat exchanger on the side of the heat source, expanding it by the second expanding mechanisms, evaporating it by the cooling heat exchangers, and returning it to the first compressor and the second compressor; and the cooling operation being continued by actuating the first compressor in place of the second compressor if the breakdown of the second compressor is detected during the cooling operation.

A second refrigeration apparatus comprises: a refrigerant circuit including first, second and third compressors juxtaposed to each other, a heat exchanger on the side of a heat source, an air-conditioning heat exchanger for air-conditioning the inside of a room, cooling heat exchangers for cooling the insides of a refrigerator and a freezer, and a first expanding mechanism and second expanding mechanisms for expanding a refrigerant; and breakdown detecting means for detecting the breakdown of at least the second compressor; the refrigeration apparatus being capable of freely performing at least a freezing operation and a cooling/freezing operation, wherein the freezing operation is performed by actuating the first compressor and the second compressor, the freezing operation being achieved by condensing a refrigerant discharged from the first compressor and the second compressor by means of the heat exchanger on the side of the heat source, expanding it by the second expanding mechanisms, evaporating it by the cooling heat exchangers, and returning it to the first compressor and the second compressor, and further, the cooling/freezing operation is performed by actuating the first compressor, the second compressor and the third compressor, the cooling/freezing operation being achieved by condensing a refrigerant discharged from the first compressor, the second compressor and the third compressor by means of the heat exchanger on the side of the heat source, reducing the pressure of a part of the condensed refrigerant down to a first low pressure by the first expanding mechanism, evaporating it by the air-conditioning heat exchanger, and returning it to the third compressor while reducing the pressure of the residual condensed refrigerant down to a second low pressure lower than the first low pressure by the second expanding mechanisms, evaporating it by the cooling heat exchangers, and returning it to the first compressor and the second compressor; the refrigerant circuit further including a refrigerant pipeline for introducing the refrigerant from pipelines on the suction sides of the first compressor and the second compressor to a pipeline on the suction side of the third compressor, and channel switching means disposed on the refrigerant pipeline; and the freezing operation being continued by opening the channel switching means, and further, actuating the third compressor in place of the second compressor if the breakdown of the second compressor is detected during the freezing operation.

A third refrigeration apparatus comprises: a refrigerant circuit including first, second and third compressors juxtaposed to each other, a heat exchanger on the side of a heat source, an air-conditioning heat exchanger for air-conditioning the inside of a room, cooling heat exchangers for cooling the insides of a refrigerator and a freezer, and a first expanding mechanism and second expanding mechanisms for expanding a refrigerant; and breakdown detecting means for detecting the breakdown of at least the second compressor; the refrigeration apparatus being capable of freely performing at least a freezing operation and a cooling/freezing operation, wherein the freezing operation is performed by actuating the first compressor and the second compressor, the freezing operation being achieved by condensing a refrigerant discharged from the first compressor and the second compressor by means of the heat exchanger on the side of the heat source, expanding it by the second expanding mechanisms, evaporating it by the cooling heat exchangers, and returning it to the first compressor and the second compressor, and further, the cooling/freezing operation is performed by actuating the first compressor, the second compressor and the third compressor, the cooling/freezing operation being achieved by condensing a refrigerant discharged from the first compressor, the second compressor and the third compressor by means of the heat exchanger on the side of the heat source, reducing the pressure of a part of the condensed refrigerant down to a first low pressure by the first expanding mechanism, evaporating it by the air-conditioning heat exchanger, and returning it to the third compressor while reducing the pressure of the residual condensed refrigerant down to a second low pressure lower than the first low pressure by the second expanding mechanisms, evaporating it by the cooling heat exchangers, and returning it to the first compressor and the second compressor; the refrigerant circuit further including a refrigerant pipeline for introducing the refrigerant from pipelines on the suction sides of the first compressor and the second compressor to a pipeline on the suction side of the third compressor, and channel switching means disposed on the refrigerant pipeline; and the cooling/freezing operation being continued by opening the channel switching means, and further, by condensing the refrigerant discharged from the first compressor and the third compressor by means of the heat exchanger on the side of the beat source, reducing the pressure down to a predetermined pressure lower than the first low pressure by the first expanding mechanism and the second expanding mechanisms, respectively, evaporating it by the air-conditioning heat exchanger and the cooling heat exchangers, and returning it to the first compressor and the third compressor if the breakdown of the second compressor is detected during the cooling/freezing operation.

A fourth refrigeration apparatus comprises: a refrigerant circuit including first, second and third compressors juxtaposed to each other, a heat exchanger on the side of a heat source, an air-conditioning heat exchanger for air-conditioning the inside of a room, cooling heat exchangers for cooling the insides of a refrigerator and a freezer, and a first expanding mechanism and second expanding mechanisms for expanding a refrigerant; and breakdown detecting means for detecting the breakdown of at least the third compressor; the refrigeration apparatus being capable of freely performing at least a freezing operation and a cooling/freezing operation, wherein the freezing operation is performed by actuating the first compressor and the second compressor, the freezing operation being achieved by condensing a refrigerant discharged from the first compressor and the second compressor by means of the heat exchanger on the side of the heat source, expanding it by the second expanding mechanisms, evaporating it by the cooling heat exchangers, and returning it to the first compressor and the second compressor, and further, the cooling/freezing operation is performed by actuating the first compressor, the second compressor and the third compressor, the cooling/freezing operation being achieved by condensing a refrigerant discharged from the first compressor, the second compressor and the third compressor by means of the heat exchanger on the side of the heat source, reducing the pressure of a part of the condensed refrigerant down to a first low pressure by the first expanding mechanism, evaporating it by the air-conditioning heat exchanger, and returning it to the third compressor while reducing the pressure of the residual condensed refrigerant down to a second low pressure lower than the first low pressure by the second expanding mechanisms, evaporating it by the cooling heat exchangers, and returning it to the first compressor and the second compressor; the refrigerant circuit further including a refrigerant pipeline for introducing the refrigerant from a pipeline on the suction side of the third compressor to pipelines on the suction sides of the first compressor and the second compressor, and channel switching means disposed on the refrigerant pipeline; and the cooling/freezing operation being continued by opening the channel switching means, and further, by condensing the refrigerant discharged from the first compressor and the second compressor by means of the heat exchanger on the side of the heat source, reducing the pressure down to a predetermined pressure lower than the first low pressure by the first expanding mechanism and the second expanding mechanisms, respectively, evaporating it by the air-conditioning heat exchanger and the cooling heat exchangers and, and returning it to the first compressor and the second compressor if the breakdown of the third compressor is detected during the cooling/freezing operation.

A fifth refrigeration apparatus comprises: a refrigerant circuit including first, second and third compressors juxtaposed to each other, a heat exchanger on the side of a heat source, an air-conditioning heat exchanger for air-conditioning the inside of a room, cooling heat exchangers for cooling the insides of a refrigerator and a freezer, and a first expanding mechanism and second expanding mechanisms for expanding a refrigerant; and breakdown detecting means for detecting the breakdown of at least the second compressor; the refrigeration apparatus being capable of freely performing at least a warming operation and a freezing operation, wherein the warming operation is performed by actuating the second compressor and the third compressor, the warming operation being achieved by condensing a refrigerant discharged from the second compressor and the third compressor by means of the air-conditioning heat exchanger, expanding it by the first expanding mechanism, evaporating it by the heat exchanger on the side of the heat source, and returning it to the second compressor and the third compressor, and further, the freezing operation is performed by actuating the first compressor and the second compressor, the freezing operation being achieved by condensing a refrigerant discharged from the first compressor and the second compressor by means of the heat exchanger on the side of the heat source, expanding it by the second expanding mechanisms, evaporating it by the cooling heat exchangers, and returning it to the first compressor and the second compressor; and the warming operation being continued by actuating the first compressor in place of the second compressor if the breakdown of the second compressor is detected during the warming operation.

A sixth refrigeration apparatus comprises: a refrigerant circuit including first, second and third compressors juxtaposed to each other, a heat exchanger on the side of a heat source, an air-conditioning heat exchanger for air-conditioning the inside of a room, cooling heat exchangers for cooling the insides of a refrigerator and a freezer, and a first expanding mechanism and second expanding mechanisms and for expanding a refrigerant; and breakdown detecting means for detecting the breakdown of at least the second compressor; the refrigeration apparatus being capable of freely performing at least a warming operation and a warming/freezing operation, wherein the warming operation is performed by actuating the second compressor and the third compressor, the warming operation being achieved by condensing a refrigerant discharged from the second compressor and the third compressor by means of the air-conditioning heat exchanger, expanding it by the first expanding mechanism, evaporating it by the heat exchanger on the side of the heat source, and returning it to the second compressor and the third compressor, and further, the warming/freezing operation is performed by actuating the first compressor and the second compressor, the warming/freezing operation being achieved by condensing a part of a refrigerant discharged from the first compressor and the second compressor by means of the air-conditioning heat exchanger while condensing the residual discharged refrigerant by means of the heat exchanger on the side of the heat source, expanding both of the refrigerants by the second expanding mechanisms, evaporating them by the cooling heat exchangers, and returning them to the first compressor and the second compressor; the refrigerant circuit further including a refrigerant pipeline for introducing the refrigerant from pipelines on the suction sides of the first compressor and the second compressor to a pipeline on the suction side of the third compressor, and channel switching means disposed on the refrigerant pipeline; and the warming/freezing operation being continued by opening the channel switching means, and further, actuating the third compressor in place of the second compressor if the breakdown of the second compressor is detected during the warming/freezing operation.

In a seventh refrigeration apparatus, the cooling heat exchangers include a refrigerating heat exchanger and a freezing heat exchanger; and the refrigerant circuit is disposed downstream of the freezing heat exchanger, and includes an auxiliary compressor for reducing the pressure of the refrigerant inside of the freezing heat exchanger lower than that of the refrigerant inside of the refrigerating heat exchanger, in any one of the first to sixth refrigeration apparatuses.

An eighth refrigeration apparatus further comprises a bypass (59) passage connected at one end thereof to the discharge side of the auxiliary compressor (53) and at the other end thereof to the suction side of the auxiliary compressor (53), for allowing the refrigerant to flow in such a manner as to bypass the auxiliary compressor (53) if the auxiliary compressor (53) is broken down, in the seventh refrigeration apparatus.

In the first refrigeration apparatus, the first compressor is driven in place of the second compressor if the second compressor is broken down during the cooling operation. A circulating operation is performed such that the refrigerant discharged from the first compressor and the third compressor is condensed by the heat source side heat exchanger, is expanded by the first expanding mechanism, is evaporated by the air-conditioning heat exchanger, and is returned to the first compressor and the third compressor. Thus, the cooling operation can be continued while maintaining the cooling performance.

In the second refrigeration apparatus, the channel switching means is opened, and further, the third compressor is driven if the second compressor is broken down during the freezing operation. A circulating operation is performed such that the refrigerant discharged from the first compressor and the third compressor is condensed by the heat source side heat exchanger, is expanded by the second expanding mechanism, is evaporated by the cooling heat exchanger, and is returned to the first compressor and the third compressor. Thus, the freezing operation can be continued while maintaining the freezing performance.

In the third refrigeration apparatus, the channel switching means is opened if the second compressor is broken down during the cooling/freezing operation. A circulating operation is performed such that the refrigerant discharged from the first compressor and the third compressor is condensed by the heat source side heat exchanger, is reduced in pressure by the first expanding mechanism and the second expanding mechanisms, is evaporated by the air-conditioning heat exchanger and the cooling heat exchanger, respectively, and is returned to the first compressor and the third compressor. Thus, the refrigerant circulating quantity in the cooling heat exchanger can be maintained. In the meantime, the refrigerant circulating quantity in the air-conditioning heat exchanger is reduced. However, since the pressure of the refrigerant in the air-conditioning heat exchanger is reduced, the evaporation temperature of the refrigerant in the air-conditioning heat exchanger is reduced. Consequently, it is possible to suppress the degradation of the cooling performance of the air-conditioning heat exchanger, although the refrigerant circulating quantity is reduced. Thus, the cooling/freezing operation can be continued while maintaining at least the freezing performance.

In the fourth refrigeration apparatus, the channel switching means is opened if the third compressor is broken down during the cooling/freezing operation. A circulating operation is performed such that the refrigerant discharged from the first compressor and the second compressor is condensed by the heat source side heat exchanger, is reduced in pressure by the first expanding mechanism and the second expanding mechanisms, is evaporated by the air-conditioning heat exchanger and the cooling heat exchanger, respectively, and is returned to the first compressor and the second compressor. Thus, the cooling/freezing operation can be continued while maintaining at least the freezing performance, like the above-described third refrigeration apparatus.

In the fifth refrigeration apparatus, the first compressor is driven in place of the second compressor if the second compressor is broken down during the warming operation. A circulating operation is performed such that the refrigerant discharged from the first compressor and the third compressor is condensed by the air-conditioning heat exchanger, is expanded by the first expanding mechanism, is evaporated by the heat source side heat exchanger, and is returned to the first compressor and the third compressor. Thus, the warming operation can be continued while maintaining the warming performance.

In the sixth refrigeration apparatus, the channel switching means is opened, and further, the third compressor is driven if the second compressor is broken down during the warming/freezing operation. A circulating operation is performed such that a part of the refrigerant discharged from the first compressor and the third compressor is condensed by the air-conditioning heat exchanger while the residual discharged refrigerant is condensed by the heat source side heat exchanger, and further, both of the refrigerants are expanded by the second expanding mechanisms, are evaporated by the cooling heat exchangers, and are returned to the first compressor and the third compressor. Thus, the warming/freezing operation can be continued while maintaining at least the freezing performance.

In the seventh refrigeration apparatus, the cooling heat exchanger includes two kinds of heat exchangers (i.e., a refrigerating heat exchanger and a freezing heat exchanger) having different evaporation temperatures, and therefore, an object to be cooled can be cooled at two kinds of cooling temperatures.

In the eighth refrigeration apparatus, the refrigerant can bypass the auxiliary compressor via the bypass passage if the auxiliary compressor is broken down, thereby achieving a smooth circulation of the refrigerant.

As described above, according to the present invention, the predetermined operation can be continued without inducing any excessive degradation of the performance even if one of the compressors is broken down. Thus, it is possible to enhance the reliability of the apparatus.

In particular, the operation can be continued without degrading the cooling performance of the cooling heat -exchanger in the case where the compressor is broken down during an operation in which the inside of a cold store is cooled by the cooling heat exchanger (such as a freezing operation, a cooling/freezing operation or a warming/freezing operation), thus preventing any deterioration of a quality of the object to be cooled.

BEST MODES FOR CARRYING OUT THE INVENTION

Figure 1:
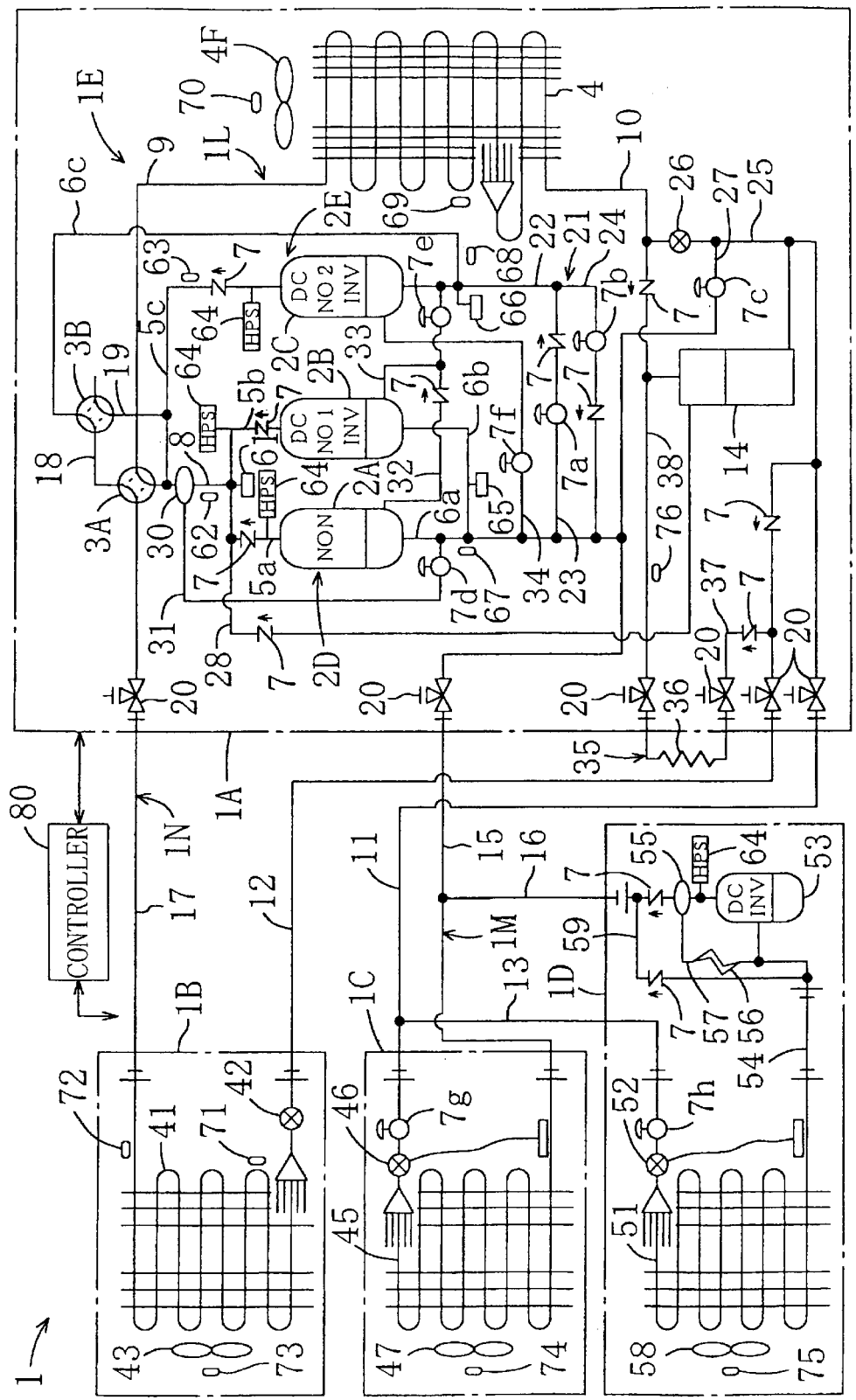
FIG. 1 is a refrigerant circuit diagram of a refrigeration apparatus.

Best modes carrying out the present invention will be described below in reference to the accompanying drawings.
General Configuration of Refrigeration Apparatus As shown in FIG. 1, a refrigeration apparatus (1) in a preferred embodiment is installed at a convenience store, and is adapted to cool the inside of a storage, i.e., a show case and warm or cool the inside of a room, i.e., the inside of the store.

The refrigeration apparatus (1) comprises an outside unit (1A), an inside unit (1B), a refrigerating unit (1C) and a freezing unit (1D), and further, includes a refrigerant circuit (1E) for performing a steam compression type freezing cycle.

The inside unit (1B) is configured such that it can selectively perform a cooling operation and a warming operation, and is installed at, for example, a shop. The refrigerating unit (1C) is mounted at a refrigerating show case, so as to cool the air inside of the show case. The freezing unit (1D) is mounted at a freezing show case, so as to cool the air inside of the show case.
Outside Unit The outside unit (1A) is provided with a non-inverter compressor (2A), a first inverter compressor (2B) and a second inverter compressor (2C), and further, includes a first 4-way switch valve (3A), a second 4-way switch valve (3B) and an outside heat exchanger (4) serving as a heat exchanger on the heat source side.

Each of the above-described compressors (2A) to (2C) is constituted of, for example, a high pressure domed scroll compressor of a sealing type. The non-inverter compressor (2A) is of a constant capacity type in which an electric motor is always driven at a constant engine speed. Each of the first inverter compressor (2B) and the second inverter compressor (2C) is of a type in which an electric motor is inverter-controlled so that its capacity can be varied stepwise or continuously.

The non-inverter compressor (2A), the first inverter compressor (2B) and the second inverter compressor (2C) constitute compressor mechanisms of two systems, that is, a compressor mechanism (2D) of a first system and a compressor mechanism (2E) of a second system. The pattern of the compressors constituting the compressor mechanisms (2D) and (2E) of these two systems can be changed in an appropriate manner. That is to say, there are two cases: the non-inverter compressor (2A) and the first inverter compressor (2B) constitute the compressor mechanism (2D) of the first system while the second inverter compressor (2C) constitutes the compressor mechanism (2E) of the second system; and the non-inverter compressor (2A) constitutes the compressor mechanism (2D) of the first system while the first inverter compressor (2B) and the second inverter compressor (2C) constitute the compressor mechanism (2E) of the second system.

Respective discharge pipes (5a), (5b) and (5c) of the non-inverter compressor 2A), the first inverter compressor (2B) and the second inverter compressor (2C) are connected to a single high pressure gas pipe (8), which is connected to a first port of the first 4-way switch valve (3A). Check valves (7) are disposed at the discharge pipe (5a) of the non-inverter compressor (2A), the discharge pipe (5b) of the first inverter compressor (2B) and the discharge pipe (5c) of the second inverter compressor (2C), respectively, such that an operation can be started by any of the compressors.

The outside heat exchanger (4) is connected at a gas side end thereof to a second port of the first 4-way switch valve (3A) via an outer gas pipe (9). In contrast, the outside heat exchanger (4) is connected at a liquid side end thereof to one end of a liquid pipe (10) serving as a liquid line. On the way of the liquid pipe (10) is disposed a receiver (14). The other end of the liquid pipe (10) is branched to a first connecting liquid pipe (11) and a second connecting liquid pipe (12).

The type of outside heat exchanger (4) is not particularly limited: for example, a fin and tube heat exchanger of a cross fin type or the like can be used preferably. In the vicinity of the outside heat exchanger (4) is disposed an outside fan (4F).

Respective suction pipes (6a) and (6b) of the non-inverter compressor (2A) and the first inverter compressor (2B) are connected to a low pressure gas pipe (15). A suction pipe (6c) of the second inverter compressor (2C) is connected to a third port of the second 4-way switch valve (3B).

To a fourth port of the first 4-way switch valve (3A) is connected a connecting gas pipe (17). A third port of the first 4-way switch valve (3A) is connected to a fourth port of the second 4-way switch valve (3B) via a connecting pipe (18). A first port of the second 4-way switch valve (3B) is connected to the discharge pipe (5c) of the second inverter compressor (2C) via an auxiliary.gas pipe (19). A second port of the second 4-way switch valve (3B) is a closed port which is closed at all times. In other words, the second 4-way switch valve (3B) is a channel switch valve for appropriately connecting the three ports. Consequently, a 3-way switch valve may be used in place of the second 4-way switch valve (3B).

The first 4-way switch valve (3A) is configured so as to be changed over from a first state (see a solid line in FIG. 1) in which the high pressure gas pipe (8) and the outside gas pipe (9) communicate with each other and further the connecting pipe (18) and the connecting gas pipe (17) communicate with each other to a second state (see a broken line in FIG. 1) in which the high pressure gas pipe (8) and the connecting gas pipe (17) communicate with each other and further the connecting pipe (18) and the outside gas pipe (9) communicate with each other, and vice versa.

In contrast, the second 4-way switch valve (3B) is configured so as to be changed over from the first state (see the solid line in FIG. 1) in which the auxiliary gas pipe (19) and the closed port communicate with each other and further the connecting pipe (18) and the suction pipe (6c) of the second inverter compressor (2C) communicate with each other to the second state (see the broken line in FIG. 1) in which the auxiliary gas pipe (19) and the connecting pipe (18) communicate with each other and further the suction pipe (6c) and the closed port communicate with each other, and vice versa.

The above-described discharge pipes (5a), (5b) and (5c), the high pressure gas pipe (8) and the outside gas pipe (9) constitute a high pressure gas line (1L) at the time of a cooling operation. Furthermore, the low pressure gas pipe (15) and the suction pipes (6a) and (6b) of the compressor mechanism (2D) of the first system constitute a first low pressure gas line (1M). Moreover, the connecting gas pipe (17) and the suction pipe (6c) of the compressor mechanism (2E) of the second system constitute a second low pressure gas line (1N) at the time of the cooling operation.

The first connecting liquid pipe (11), the second connecting liquid pipe (12), the connecting gas pipe (17) and the low pressure gas pipe (15) extend outside of the outside unit (1A), and are provided with closing valves (20), respectively, inside of the outside unit (1A). Additionally, at the end on the branch side of the second connecting liquid pipe (12), a check valve (7) is disposed inside of the outside unit (1A), so as to allow a refrigerant to flow from the receiver (14) to the closing valve (20).

The low pressure gas pipe (15) and the suction pipe (6c) of the second inverter compressor (2C) are connected to each other via a communicating pipe (21) serving as an auxiliary line. The communicating pipe (21) allows respective suction sides of the non-inverter compressor (2A), the first inverter compressor (2B) and the second inverter compressor (2C) to communicate with each other. The communicating pipe (21) includes a main pipe (22), and a first sub pipe (23) and a second sub pipe (24), which are branched from the main pipe (22). The main pipe (22) is connected to the suction pipe (6c) of the second inverter compressor (2C). The first sub pipe (23) and the second sub pipe (24) are connected to the low pressure gas pipe (15).

The first sub pipe (23) and the second sub pipe (24) are provided with solenoid valves (7a) and (7b) serving as opening/closing mechanisms and check valves (7), respectively. That is to say, the first sub pipe (23) is configured such that it allows the refrigerant to flow from the pipes on the suction sides of the non-inverter compressor (2A) and the first inverter compressor (2B) to the pipe on the suction side of the second inverter compressor (2C). In contrast, the second sub pipe (24) is configured such that it allows the refrigerant to flow from the pipe on the suction side of the second inverter compressor (2C) to the pipes on the suction sides of the non-inverter compressor (2A) and the first inverter compressor (2B).

To the liquid pipe (10) is connected an auxiliary liquid pipe (25), which bypasses the receiver (14). The refrigerant flows in the auxiliary liquid pipe (25) mainly during a warming operation. The auxiliary liquid pipe (25) is provided with an outside expanding valve (26) serving as an expanding mechanism. Between the outside heat exchanger (4) on the liquid pipe (10) and the receiver (14) is interposed a check valve (7) for allowing only the flow of the refrigerant toward the receiver (14). The check valve (7) is located between a joint of the auxiliary liquid pipe (25) on the liquid pipe (10) and the receiver (14).

A liquid injection pipe (27) is connected between the auxiliary liquid pipe (25) and the low pressure gas pipe (15). The liquid injection pipe (27) is provided with a solenoid valve (7c). Furthermore, a degassing pipe (28) is interposed between the upper portion of the receiver (14) and the discharge pipe (5a) of the non-inverter compressor (2A). The degassing pipe (28) is provided with a check valve (7) for allowing only the flow of the refrigerant from the receiver (14) toward the discharge pipe (5a).

The high pressure gas pipe (8) is provided with an oil separator (30). To the oil separator (30) is connected one end of an oil returning pipe (31). The oil returning pipe (31) is provided with a solenoid valve (7d), and is connected at the other end thereof to the suction pipe (6a) of the non-inverter compressor (2A). A first oil smoothing pipe (32) is connected between the dome of the non-inverter compressor (2A) and the suction pipe (6c) of the second inverter compressor (2C). On the first oil smoothing pipe (32) are disposed a check valve (7) and a solenoid valve (7e) for allowing the flow of oil from the non-inverter compressor (2A) toward the second inverter compressor (2C).

To the dome of the first inverter compressor (2B) is connected one end of a second oil smoothing pipe (33). The other end of the second oil smoothing pipe (33) is connected between the check valve (7) and the solenoid valve (7e) of the first oil smoothing pipe (32). Moreover, a third oil smoothing pipe (34) is connected between the dome of the second inverter compressor (2C) and the low pressure gas pipe (15). The third oil smoothing pipe (34) is provided with a solenoid valve (7f).

A floor warming circuit (35) is connected to the liquid pipe (10). The floor warming circuit (35) includes a heat exchanger (36) for warming a floor, a first pipeline (37) and a second pipeline (38). One end of the first pipeline (37) is connected between the check valve (7) and the closing valve (20) on the first connecting liquid pipe (11); in contrast, the other end thereof is connected to the heat exchanger (36) for warming a floor. One end of the second pipeline (38) is connected between the check valve (7) on the liquid pipe (10) and the receiver (14); in contrast, the other end thereof is connected to the heat exchanger (36) for warming a floor. The heat exchanger (36) for warming a floor is put at a register (at a checkout counter), at which a clerk works for a long time, at a convenience store.

Closing valves (20) are disposed on the first pipeline (37) and the second pipeline (38), respectively. The first pipeline (37) is provided with a check valve (7) for allowing only the flow of the refrigerant toward the heat exchanger (36) for warming a floor. Incidentally, the heat exchanger (36) for warming a floor may be omitted. In the case where no heat exchanger (36) for warming a floor is provided, the first pipeline (37) and the second pipeline (38) are connected directly to each other.

Inside Unit

The inside unit (1B) comprises an inside heat exchanger (41) serving as a heat exchanger on a using side and an inside expanding valve (42) serving as an expanding mechanism. The connecting gas pipe (17) is connected onto the gas side of the inside heat exchanger (41). In contrast, the second connecting liquid pipe (12) is connected onto the liquid side of the inside heat exchanger (41) via the inside expanding valve (42). Here, the type of inside heat exchanger (41) is not particularly limited: for example, a fin and tube heat exchanger of a cross fin type or the like can be used preferably. In the vicinity of the inside heat exchanger (41) is disposed an inside fan (43) serving as a fan on the using side.

Refrigerating Unit

The refrigerating unit (1C) comprises a refrigerating heat exchanger (45) serving as a cooling heat exchanger and a refrigerating expanding valve (46) serving as an expanding mechanism. The first connecting liquid pipe (11) is connected onto the liquid side of the refrigerating heat exchanger (45) via a solenoid valve (7g) and the refrigerating expanding valve (46). In contrast, the low pressure gas pipe (15) is connected onto the gas side of the refrigerating heat exchanger (45).

The refrigerating heat exchanger (45) communicates with the suction side of the compressor mechanism (2D) of the first system; in contrast, the inside heat exchanger (41) communicates with the suction side of the second inverter compressor (2C) during the cooling operation. Consequently, the refrigerant pressure (i.e., the evaporation pressure) of the refrigerating heat exchanger (45) normally becomes lower than that of the inside heat exchanger (41). As a result, a refrigerant evaporation temperature at the refrigerating heat exchanger (45) becomes, for example, −10° C.; in contrast, a refrigerant evaporation temperature at the inside heat exchanger (41) becomes, for example, +5° C. In this manner, the refrigerant circuit (1E) constitutes a circuit for so-called evaporation at different temperatures.

Here, the refrigerating expanding valve (46) is a thermosensitive expanding valve, in which a thermosensitive cylinder is attached onto the gas side of the refrigerating heat exchanger (45). For example, a fin and tube heat exchanger of a cross fin type or the like can be preferably used as the refrigerating heat exchanger (45). in the vicinity of the refrigerating heat exchanger (45) is disposed a refrigerating fan (47) serving as a cooling fan.

Freezing Unit

The freezing unit (1D) comprises a freezing heat exchanger (51) serving as a cooling heat exchanger, a freezing expanding valve (52) serving as an expanding mechanism and a booster compressor (53) serving as a freezing compressor. A branch liquid pipe (13) branching off from the first connecting liquid pipe (11) is connected onto the liquid side of the freezing heat exchanger (51) via a solenoid valve (7h) and the freezing expanding valve (52).

The gas side of the freezing heat exchanger (51) and the suction side of the booster compressor (53) are connected to each other via a connecting gas pipe (54). Onto the discharge side of the booster compressor (53) is connected a branch gas pipe (16) branching off from the low pressure gas pipe (15). On the branch gas pipe (16) are disposed a check valve (7) and an oil separator (55). Between the oil separator (55) and the connecting gas pipe (54) is connected an oil returning pipe (57) having a capillary tube (56).

The booster compressor (53) compresses the refrigerant at two stages in cooperation with the compressor mechanism (2D) of the first system, so as to set a refrigerant evaporation temperature at the freezing heat exchanger (51) lower than that at the refrigerating heat exchanger (45). The refrigerant evaporation temperature at the freezing heat exchanger (51) is set to, for example, −40° C.

Here, the freezing expanding valve (52) is a thermosensitive expanding valve, in which a thermosensitive cylinder is attached onto the gas side of the freezing heat exchanger (51). For example, a fin and tube heat exchanger of a cross fin type or the like can be preferably used as the freezing heat exchanger (51). In the proximity of the freezing heat exchanger (51) is disposed a freezing fan (58) serving as a cooling fan.

Additionally, a bypass pipe (59) having a check valve (7) is connected between the connecting gas pipe (54) on the suction side of the booster compressor (53) and the downstream side of the check valve (7) of the branch gas pipe (16) on the discharge side of the booster compressor (53). The bypass pipe (59) is adapted to allow the refrigerant to flow while bypassing the booster compressor (53) if the booster compressor (53) accidentally stops due to a breakdown or the like.

Control System

The refrigerant circuit (1E) includes various kinds of sensors and various kinds of switches. On the high pressure gas pipe (8) in the outside unit (1A), there are provided a high pressure sensor (61) serving as pressure detecting means for detecting the pressure of a high pressure refrigerant and a discharge temperature sensor (62) serving as temperature detecting means for detecting the temperature of a high pressure refrigerant. On the discharge pipe (5c) of the second inverter compressor (2C), there is provided a discharge temperature sensor (63) serving as temperature detecting means for detecting the temperature of a high pressure refrigerant. Furthermore, pressure switches (64), which are actuated when the pressure of the high pressure refrigerant exceeds a predetermined value, are provided on the discharge pipes (5a), (5b) and (5c) of the non-inverter compressor (2A), the first inverter compressor (2B) and the second inverter compressor (2C), respectively.

On the suction pipes (6b) and (6c) of the first inverter compressor (2B) and the second inverter compressor (2C), there are provided low pressure sensors (65) and (66) serving as pressure detecting means for detecting the pressure of a low pressure refrigerant and suction temperature sensors (67) and (68) serving as temperature detecting means for detecting the temperature of a low pressure refrigerant, respectively.

The outside heat exchanger (4) includes an outside heat exchange temperature sensor (69) serving as temperature detecting means for detecting an evaporation temperature or a condensation temperature as the temperature of the refrigerant in the outside heat exchanger (4). Moreover, the outside unit (1A) includes an outside air temperature sensor (70) serving as temperature detecting means for detecting the temperature of an outside air.

The inside heat exchanger (41) includes an inside heat exchange temperature sensor (71) serving as temperature detecting means for detecting a condensation temperature or an evaporation temperature as the temperature of the refrigerant in the inside heat exchanger (41), and a gas temperature sensor (72) serving as temperature detecting means for detecting the temperature of a gaseous refrigerant on the gas side of the inside heat exchanger (41). Moreover, the inside unit (1B) includes an inside air temperature sensor (73) serving as temperature detecting means for detecting the temperature of an inside air.

The refrigerating unit (1C) includes a refrigerating temperature sensor (74) serving as temperature detecting means for detecting the temperature inside of the refrigerating show case. The freezing unit (1D) includes a freezing temperature sensor (75) serving as temperature detecting means for detecting the temperature inside of the freezing show case.

The second pipeline (38) in the floor warming circuit (35) includes a liquid temperature sensor (76) serving as temperature detecting means for detecting the temperature of the refrigerant which has flowed through the heat exchanger (36) for warming the floor.

Output signals from the various sensors and the various switches are input into a controller (80). The controller (80) is configured such that it can control the capacities and the like of the first inverter compressor (2B) and the second inverter compressor (2C).

Furthermore, the controller (80) includes a breakdown detecting unit for detecting the breakdown of each of the compressors (2A), (2B) and (2C). The well-known technique can be used for detecting the breakdown of the compressor: for example, a breakdown can be detected based on an overcurrent, a discharge refrigerant temperature or the like of each of the compressors (2A), (2B) and (2C). A breakdown judging method also is not limited in particular: for example, a breakdown may be judged if abnormality in terms of the compressor occurs five consecutive times at the time of starting.

The controller (80) is configured such that it not only detects the breakdown of the compressor, but also carries out various operations, described below, and controls to switch the operations.

Cooling Operation

In a cooling operation, the inside unit (1B) is actuated to perform only a cooling operation. During the cooling operation, the non-inverter compressor (2A) constitutes the compressor mechanism (2D) of the first system while the first inverter compressor (2B) and the second inverter compressor (2C) constitute the compressor mechanism (2E) of the second system, as illustrated in FIG. 2, and only the first inverter compressor (2B) and the second inverter compressor (2C) constituting the compressor mechanism (2E) of the second system are driven.

Figure 2:
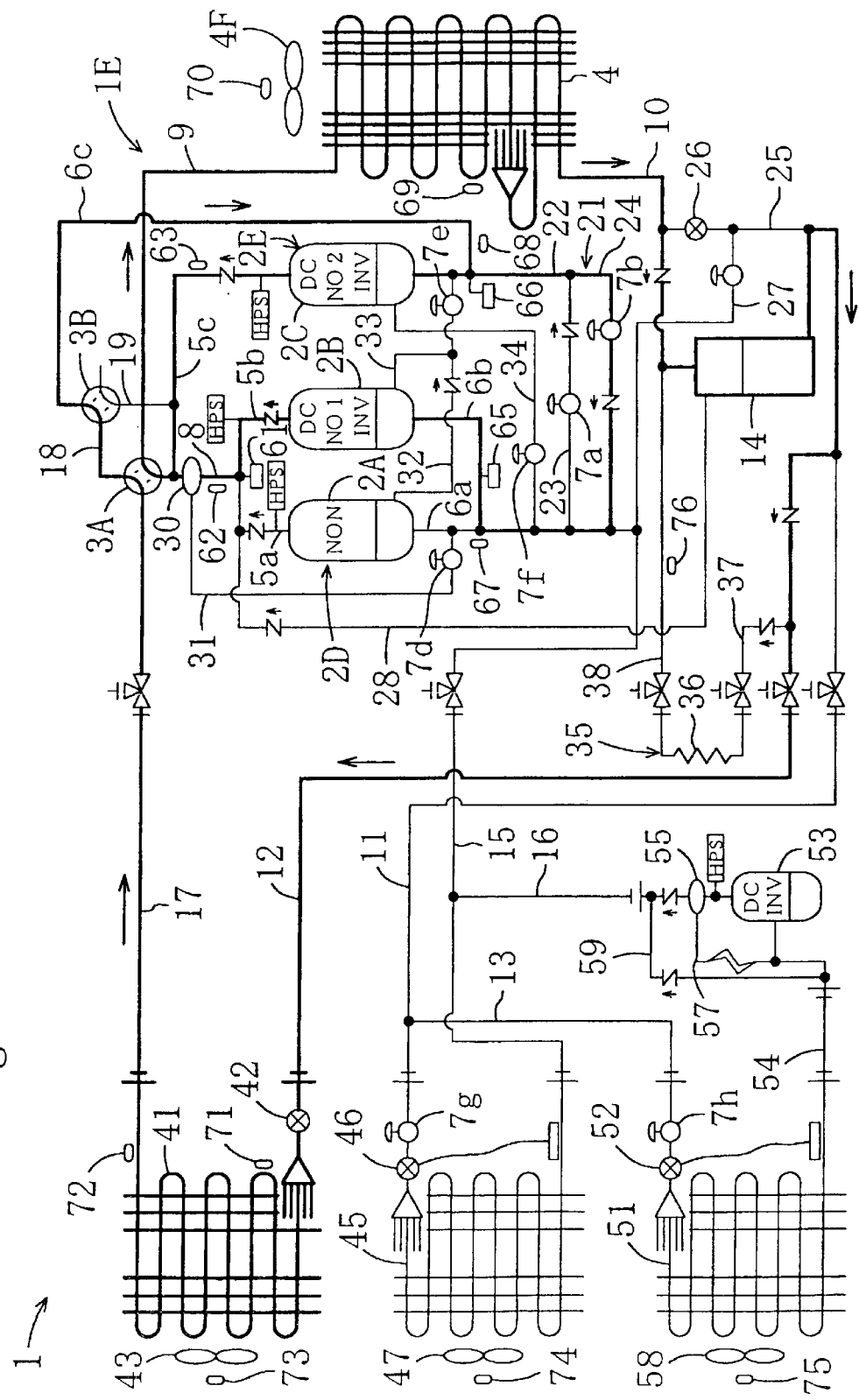
FIG. 2 is a refrigerant circuit diagram illustrating a refrigerant circulation during a cooling operation.

As indicated by a solid line in FIG. 2, each of the first 4-way switch valve (3A) and the second 4-way switch valve (3B) are switched to the first state. The solenoid valve (7b) disposed on the second sub pipe (24) of the communicating pipe (21) is opened. In the meantime, the solenoid valve (7a) disposed on the first sub pipe (23) of the communicating pipe (21), the outside expanding valve (26), the solenoid valve (7g) in the refrigerating unit (1C) and the solenoid valve (7h) in the freezing unit (1D) are closed.

In this state, the refrigerant discharged from the first inverter compressor (2B) and the second inverter compressor (2C) flows into the outside heat exchanger (4) from the first 4-way switch valve (3A) via the outside gas pipe (9), and then, is condensed in the outside heat exchanger (4). The condensed liquid refrigerant flows in the liquid pipe (10) and the second connecting liquid pipe (12) via the receiver (14), and then, is expanded by the inside expanding valve (42), and finally, is evaporated in the inside heat exchanger (41). The evaporated gaseous refrigerant flows into the suction pipe (6c) of the second inverter compressor (2C) from the connecting gas pipe (17) via the first 4-way switch valve (3A) and the second 4-way switch valve (3B), and then, returns to the first inverter compressor (2B) and the second inverter compressor (2C). The inside of a room, i.e., the inside of a store is cooled by repeating the above-described circulation of the refrigerant.

Figure 3:
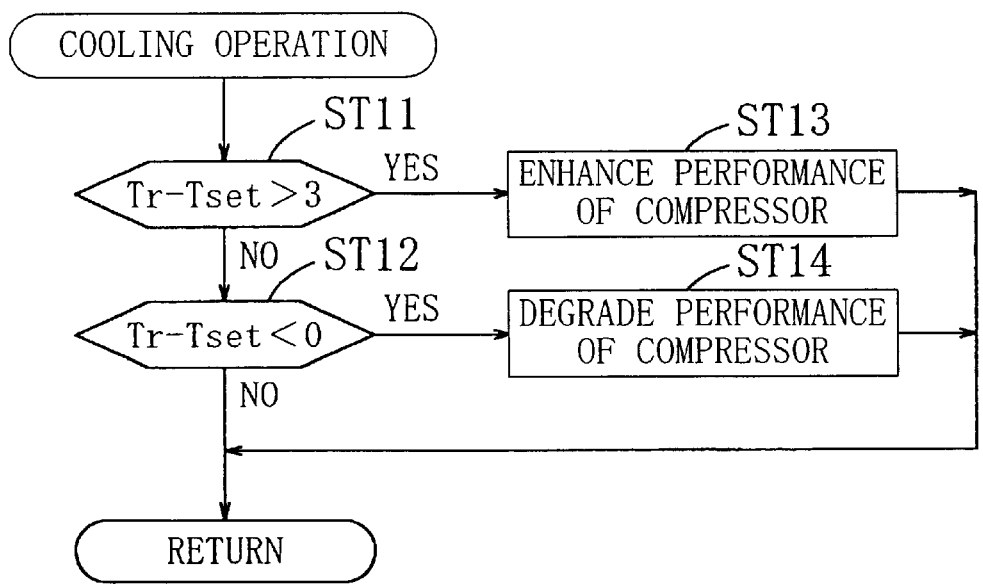
FIG. 3 is a flowchart illustrating the control of the cooling operation.

During this cooling operation, the compressors (2B) and (2C) are controlled as illustrated in FIG. 3. This control is relevant to two judgements, as follows: in step ST11, it is judged whether or not a first condition is satisfied where an inside temperature Tr, which is detected by the inside temperature sensor (73), is higher than a temperature obtained by adding 3° C. to a setting temperature Tset; and in step ST12, it is judged whether or not a second condition is satisfied where the inside temperature Tr is lower than the setting temperature Tset.

If the first condition in step ST11 is satisfied, the control proceeds to step ST13, in which the performance of the first inverter compressor (2B) or the second inverter compressor (2C) is enhanced, and then, the control is returned. In contrast, if the first condition in step ST11 is not satisfied but the second condition in step ST12 is satisfied, the control proceeds to step ST14, in which the performance of the first inverter compressor (2B) or the second inverter compressor (2C) is degraded, and then, the control is returned. Furthermore, unless the second condition in step ST12 is satisfied, it is found that the current performance of the compressor is sufficient. Therefore, the control is returned, and then, the above-described processing is repeated.

Figure 4:
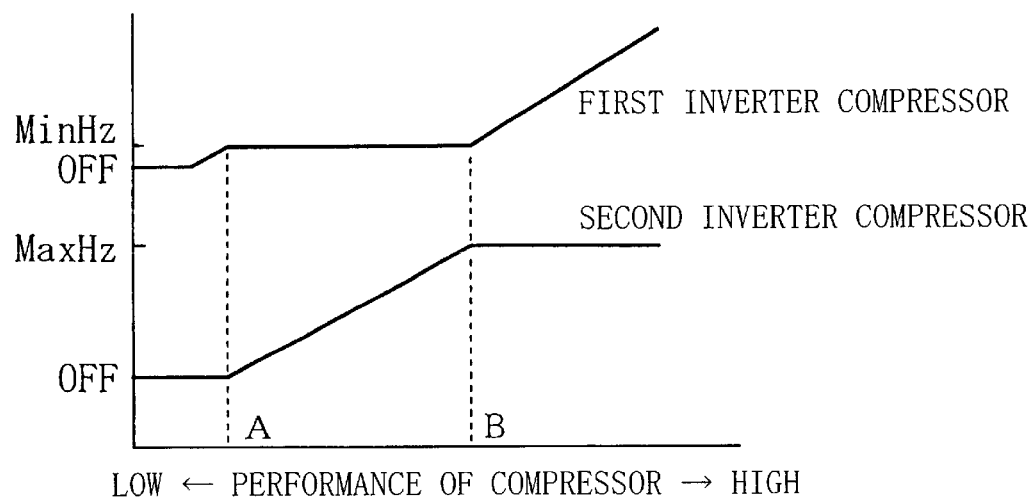
FIG. 4 is a graph illustrating a first capacity control.

In the present cooling operation, the capacity of the compressor is controlled in steps ST13 and ST14, as follows: namely, as illustrated in FIG. 4, in the above-described control of increasing the capacity of the compressor, the capacity of one of the inverter compressors (here, the first inverter compressor (2B)) is first increased from zero in a stop state up to a lowest capacity (see a point A), and then, the other inverter compressor (here, the second inverter compressor (2C)) is driven from the stop state to be increased in its capacity while maintaining the first inverter compressor (2B) at the lowest capacity. Thereafter, when a load is further increased, the capacity of the first inverter compressor (2B) is increased while maintaining the second inverter compressor (2C) at a highest capacity (see a point B). To the contrary, in the control of decreasing the capacity of the compressor, the control is performed in accordance with procedures reverse to those in the above-described increasing control. Hereinafter, the above-described control of the capacity of the compressor, that is, the control of the capacity in the case where both of the compressors are of an inverter type, is referred to as "a first capacity control".

Incidentally, the opening degree of the inside expanding valve (42) is controlled by overheating based on the temperatures detected by the inside heat exchange temperature sensor (71) and the gas temperature sensor (72).

Cooling Operation in Case of Breakdown of Compressor

In the present refrigeration apparatus (1), if either one of the first inverter compressor (2B) and the second inverter compressor (2C) is broken down during the above-described cooling operation, the non-inverter compressor (2A) is driven in place of the broken compressor, so that the cooling operation can be continued.

Figure 5:
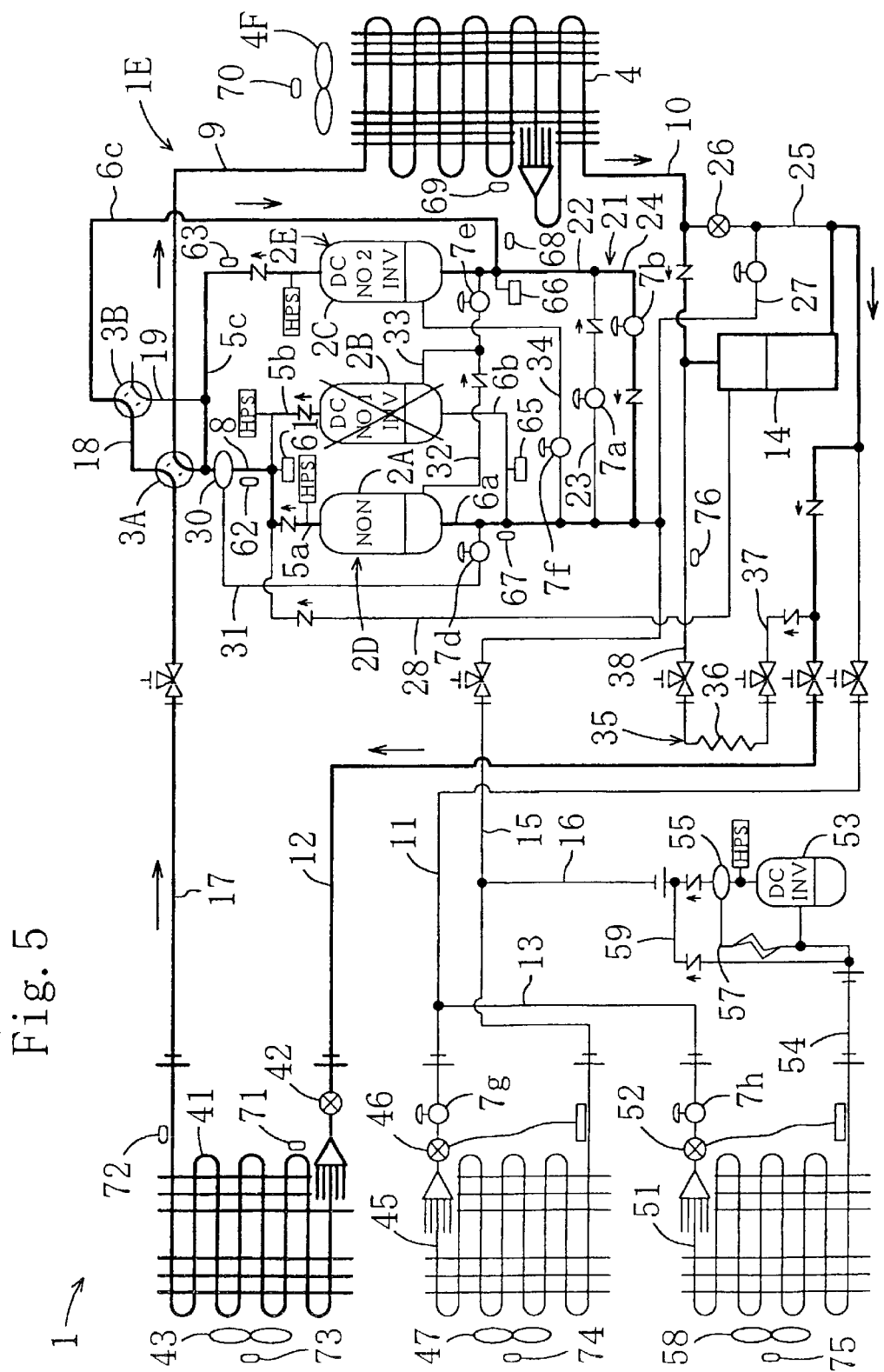
FIG. 5 is a refrigerant circuit diagram illustrating a refrigerant circulation during the cooling operation in the case where a compressor is broken down.

For example, if the first inverter compressor (2B) is broken down during the cooling operation, the controller (80) detects the breakdown, and then, stops the operation of the compressor (2B) while starts the non-inverter compressor (2A), which has not be operated. That is to say, the controller (80) actuates the non-inverter compressor (2A) in place of the broken compressor (2B). Consequently, the refrigerant circulates, as illustrated in FIG. 5. In other words, a circulating operation is performed such that the refrigerant discharged from the non-inverter compressor (2A) and the second inverter compressor (2C) is condensed in the outside heat exchanger (4), is expanded by the inside expanding valve (42), is evaporated in the inside heat exchanger (41), and finally, returns to the non-inverter compressor (2A) and the second inverter compressor (2C).

Figure 6:
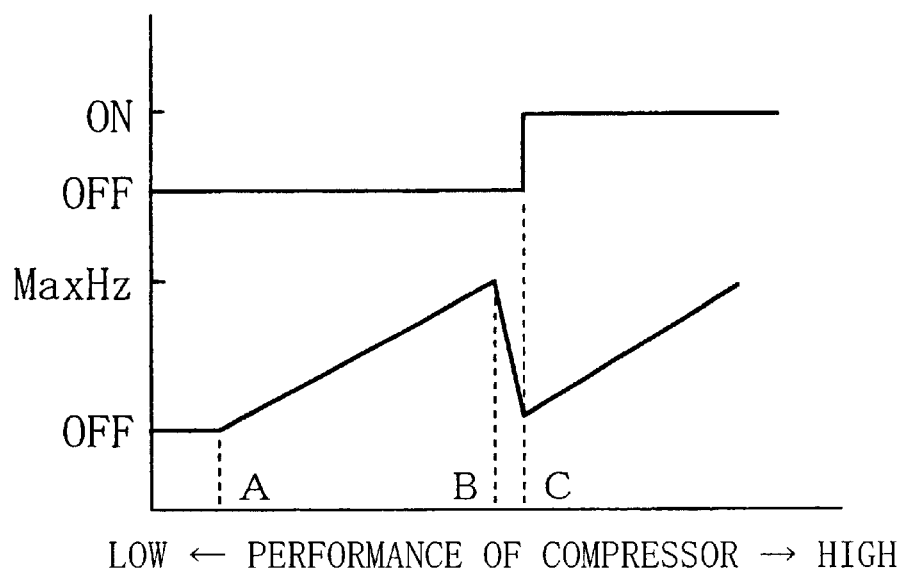
FIG. 6 is a graph illustrating a second capacity control.

In the present operation, the capacity of the compressor is controlled, as follows: namely, as illustrated in FIG. 6, when a load is small, the inverter compressor (the second inverter compressor (2C) in the present operation) is first driven in the state in which the non-inverter compressor (2A) is inoperative (see a point A), so that the capacity is increased. If the load is further increased after the capacity of the second inverter compressor (2C) is increased to reach a greatest capacity (see a point B), the non-inverter compressor (2A) is driven, and at the same time, the second inverter compressor (2C) is decreased down to a smallest capacity (see a point C). Thereafter, if the load is further increased, the capacity of the second inverter compressor (2C) is increased. To the contrary, in the control of decreasing the capacity of the compressor, the control is performed in accordance with procedures reverse to those in the above-described increasing control. Hereinafter, the above-described control of the capacity of the compressor, that is, the control of the capacity in the case where either one of the compressors is of a non-inverter type while the other compressor is of an inverter type, is referred to as "a second capacity control".

Furthermore, even if the second inverter compressor (2C) is accidentally broken down during the cooling operation, the cooling operation can be continued in the same manner as described above.

As described above, according to the present refrigeration apparatus (1), even if one of the compressors is broken down during the cooling operation, the cooling operation can be continued as it is without stopping the cooling operation and inducing any insufficient cooling performance.

Freezing Operation

In a freezing operation, the refrigerating unit (1C) and the freezing unit (1D) are actuated to perform only the cooling operation. During the freezing operation, the non-inverter compressor (2A) and the first inverter compressor (2B) constitute the compressor mechanism (2D) of the first system while the second inverter compressor (2C) constitutes the compressor mechanism (2E) of the second system, as illustrated in FIG. 7, and only the non-inverter compressor (2A) and the first inverter compressor (2B) constituting the compressor mechanism (2D) of the first system are driven, and further, the booster compressor (53) also is driven.

Figure 7:
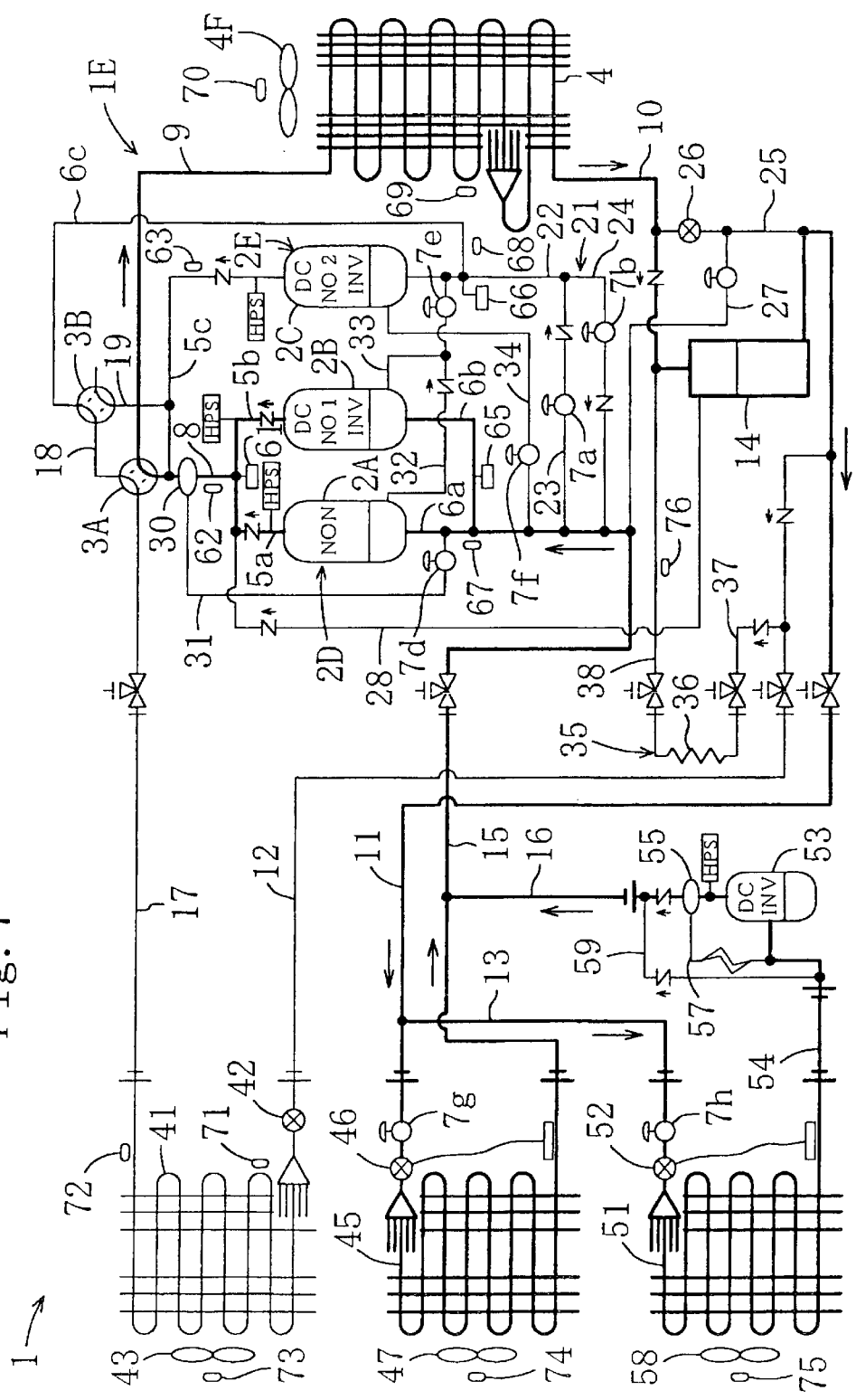
FIG. 7 is a refrigerant circuit diagram illustrating a refrigerant circulation during a freezing operation.

As indicated by a solid line in FIG. 7, the first 4-way switch valve (3A) is switched to the first state. The solenoid valve (7g) in the refrigerating unit (1C) and the solenoid valve (7h) in the freezing unit (1D) are opened. In the meantime, the two solenoid valves (7a) and (7b) disposed on the communicating pipe (21), the outside expanding valve (26) and the inside expanding valve (42) are closed.

In this state, the refrigerant discharged from the non-inverter compressor (2A) and the first inverter compressor (2B) flows into the outside heat exchanger (4) from the first 4-way switch valve (3A) via the outside gas pipe (9), and then, is condensed in the outside heat exchanger (4). The condensed liquid refrigerant flows in the liquid pipe (10) and the first connecting liquid pipe (11) via the receiver (14). A part of the refrigerant is evaporated in the refrigerating heat exchanger (45) via the refrigerating expanding valve (46).

In the meantime, the residual liquid refrigerant flowing in the first connecting liquid pipe (11) flows in the branch liquid pipe (13), and then, is evaporated in the freezing heat exchanger (51) via the freezing expanding valve (52). The gaseous refrigerant evaporated in the freezing heat exchanger (51) is sucked to and compressed by the booster compressor (53), and then, is discharged to the branch gas pipe (16).

The gaseous refrigerant evaporated in the refrigerating heat exchanger (45) and the gaseous refrigerant discharged from the booster compressor (53) are converged together in the low pressure gas pipe (15), and then, return to the non-inverter compressor (2A) and the first inverter compressor (2B). The inside of the refrigerating show case and the inside of the freezing show case are cooled by repeating the above-described circulation of the refrigerant.

In this manner, since the refrigerant flowing out of the freezing heat exchanger (51) is sucked to the booster compressor (53), the pressure of the refrigerant in the freezing heat exchanger (51) becomes lower than that in the refrigerating heat exchanger (45). Consequently, for example, the temperature (i.e., the evaporation temperature) of the refrigerant in the freezing heat exchanger (51) becomes −40° C.; in contrast, the temperature (i.e., the evaporation temperature) of the refrigerant in the refrigerating heat exchanger (45) becomes −10° C. That is to say, the cooling operation is performed at different cooling temperatures.

Figure 8:
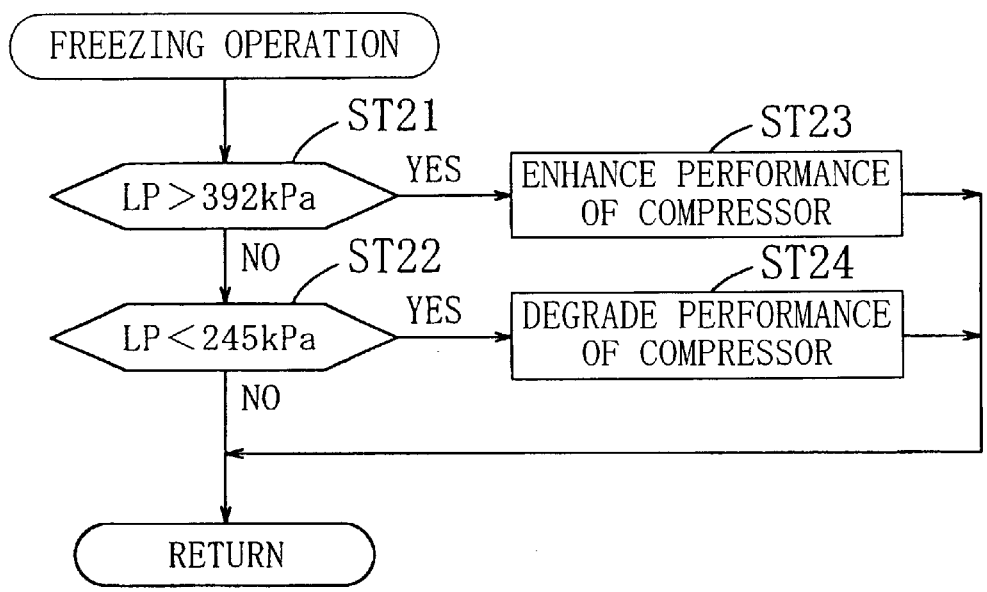
FIG. 8 is a flowchart illustrating the control of the freezing operation.

During this freezing operation, the capacity of the compressor is controlled as illustrated in FIG. 8. This control is relevant to two judgements, as follows: in step ST21, it is judged whether or not a first condition is satisfied where the pressure LP of a low pressure refrigerant, which is detected by the low pressure sensor (65) or (66), is higher than 392 kPa; and in step ST22, it is judged whether or not a second condition is satisfied where the pressure LP of the low pressure refrigerant is lower than 245 kPa.

If it is judged in step ST21 that the first condition is satisfied, the control proceeds to step ST23, in which the performance of the first inverter compressor (2B) or the non-inverter compressor (2A) is enhanced, and then, the control is returned. In contrast, if it is judged in step ST21 that the first condition is not satisfied but it is judged in step ST22 that the second condition is satisfied, the control proceeds to step ST24, in which the performance of the first inverter compressor (2B) or the non-inverter compressor (2A) is degraded, and then, the control is returned. Furthermore, if it is judged in step ST22 that the second condition is not satisfied, it is found that the current performance of the compressor is sufficient. Therefore, the control is returned, and then, the above-described processing is repeated.

In the present operation, since the non-inverter compressor (2A) and the first inverter compressor (2B) carry out the operation, the above-described second capacity control is performed in steps ST23 and ST24 (see FIG. 6).

In addition, the opening degrees of the refrigerating expanding valve (46) and the freezing expanding valve (52) are controlled by overheating by the use of the thermosensitive cylinder. Hereinafter, the same goes for each of the operations.

Freezing Operation in Case of Breakdown of Compressor

In the present refrigeration apparatus (1), if either one of the non-inverter compressor (2A) and the first inverter compressor (2B) is broken down during the above-described freezing operation, the second inverter compressor (2C) is driven, and further, the solenoid valve (7a) of the first sub pipe (23) is opened, thereby continuing the freezing operation.

Figure 9:
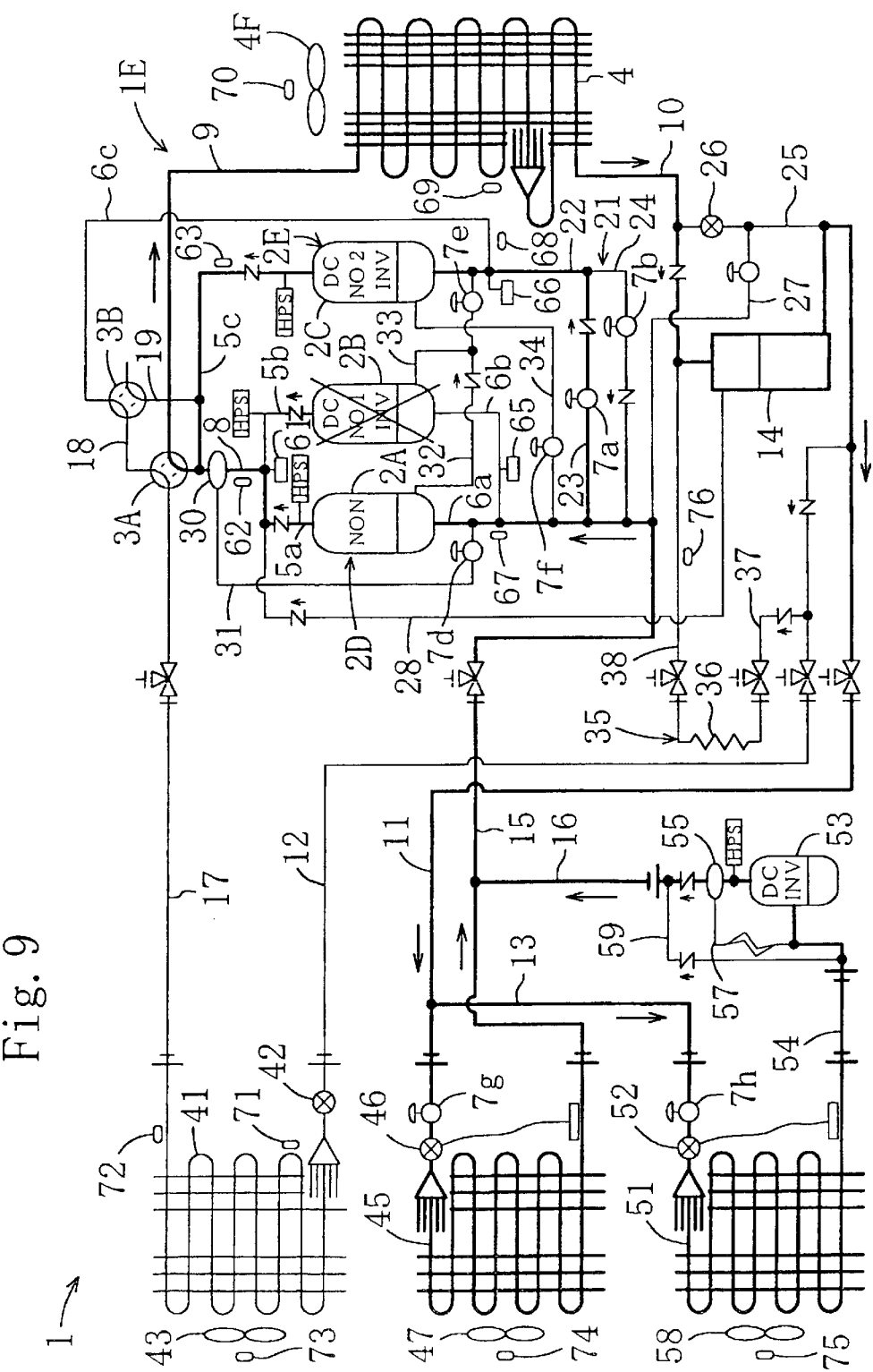
FIG. 9 is a refrigerant circuit diagram illustrating a refrigerant circulation during the freezing operation in the case where a compressor is broken down.

Specifically, if the first inverter compressor (2B) is broken down during the freezing operation, the controller (80) detects the breakdown, and then, stops the operation of the compressor (2B) while starts the second inverter compressor (2C), which has not be operated, and further, opens the solenoid valve (7a). Consequently, the refrigerant circulates as illustrated in FIG. 9. In other words, a circulating operation is performed such that the refrigerant discharged from the non-inverter compressor (2A) and the second inverter compressor (2C) is condensed in the outside heat exchanger (4), is expanded by the refrigerating expanding valve (46) and the freezing expanding valve (52), is evaporated in the refrigerating heat exchanger (45) and the freezing heat exchanger (51), and finally, returns to the non-inverter compressor (2A) and the second inverter compressor (2C).

The non-inverter compressor (2A) and the second inverter compressor (2C) are controlled in accordance with the above-described second capacity control (see FIG. 6).

In contrast, if the non-inverter compressor (2A) is broken down during the freezing operation, the controller (80) detects the breakdown, and then, stops the operation of the compressor (2A) while starts the second inverter compressor (2C), which has not been operated, and further, opens the solenoid valve (7a). In this case, a circulating operation is performed such that the refrigerant discharged from the first inverter compressor (2B) and the second inverter compressor (2C) is condensed in the outside heat exchanger (4), is expanded by the refrigerating expanding valve (46) and the freezing expanding valve (52), is evaporated in the refrigerating heat exchanger (45) and the freezing heat exchanger (51), and finally, returns to the first inverter compressor (2B) and the second inverter compressor (2C).

The first inverter compressor (2B) and the second inverter compressor (2C) are controlled in accordance with the above-described first capacity control (see FIG. 4).

As a consequence, even if one of the compressors is broken down during the freezing operation, the freezing operation can be continued as it is without stopping the freezing operation and inducing any insufficient freezing performance.

Cooling/Freezing Operation

Figure 10:
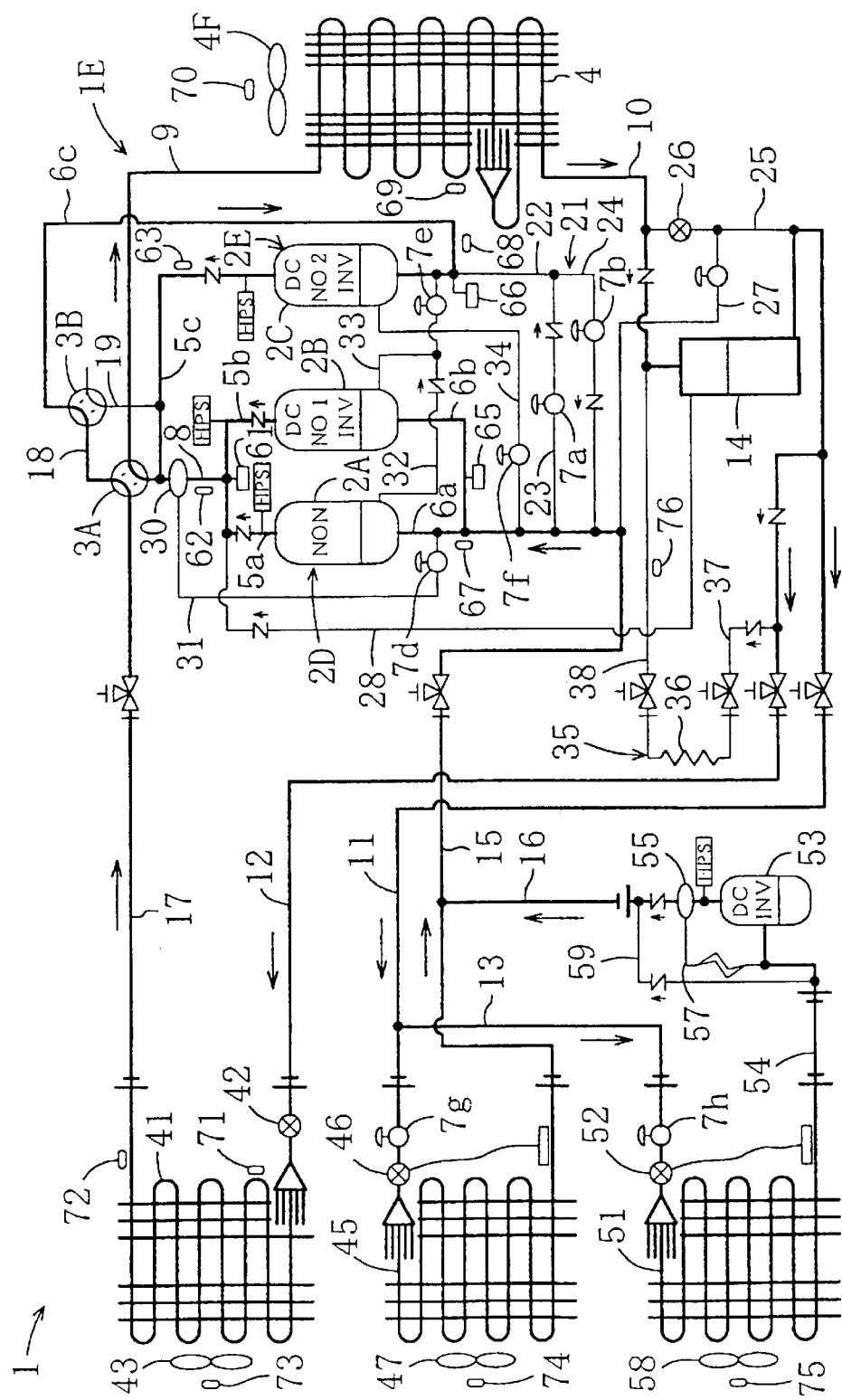
FIG. 10 is a refrigerant circuit diagram illustrating a refrigerant circulation during a cooling/freezing operation.

In a cooling/freezing operation, the cooling operation in the inside unit (1B) is performed, and further, the freezing operation in the refrigerating unit (1C) and the freezing unit (1D) are performed at the same time. During the cooling/freezing operation, the non-inverter compressor (2A) and the first inverter compressor (2B) constitute the compressor mechanism (2D) of the first system while the second inverter compressor (2C) constitutes the compressor mechanism (2E) of the second system, as illustrated in FIG. 10. The non-inverter compressor (2A), the first inverter compressor (2B) and the second inverter compressor (2C) are driven, and further, the booster compressor (53) also is driven.

As indicated by a solid line in FIG. 10, the first 4-way switch valve (3A) and the second 4-way switch valve (3B) are switched to the first state, respectively. The solenoid valve (7g) in the refrigerating unit (1C) and the solenoid valve (7h) in the freezing unit (1D) are opened. In the meantime, the two solenoid valves (7a) and (7b) disposed on the communicating pipe (21) and the outside expanding valve (26) are closed.

In this state, the refrigerants discharged from the non-inverter compressor (2A), the first inverter compressor (2B) and the second inverter compressor (2C) are converged together in the high pressure gas pipe (8), and then, the converged refrigerant is condensed in the outside heat exchanger (4) from the first 4-way switch valve (3A) via the outside gas pipe (9). The condensed liquid refrigerant flows in the liquid pipe (10), and then, is divided to the first connecting liquid pipe (11) and the second connecting liquid pipe (12) via the receiver (14).

The liquid refrigerant flowing in the second connecting liquid pipe (12) is expanded in the inside expanding valve (42), and then, is evaporated in the inside heat exchanger (41). The evaporated gaseous refrigerant flows in the suction pipe (6c) from the connecting gas pipe (17) via the first 4-way switch valve (3A) and the second 4-way switch valve (3B), and then, returns to the second inverter compressor (2C).

In the meantime, a part of the liquid refrigerant flowing in the first connecting liquid pipe (11) is expanded in the refrigerating expanding valve (46), and then, is evaporated in the refrigerating heat exchanger (45). Furthermore, the residual liquid refrigerant flowing in the first connecting liquid pipe (11) flows in the branch liquid pipe (13), is expanded in the freezing expanding valve (52), and then, is evaporated in the freezing heat exchanger (51). The gaseous refrigerant evaporated in the freezing heat exchanger (51) is sucked to and compressed by the booster compressor (53), and finally, is discharged to the branch gas pipe (16).

The gaseous refrigerant evaporated in the refrigerating heat exchanger (45) and the gaseous refrigerant discharged from the booster compressor (53) are converged together in the low pressure gas pipe (15), and then, return to the non-inverter compressor (2A) and the first inverter compressor (2B).

The inside of the room, i.e., the inside of the store, the inside of the refrigerating show case and the inside of the freezing show case are cooled by repeating the above-described circulation of the refrigerant.

Figure 11:
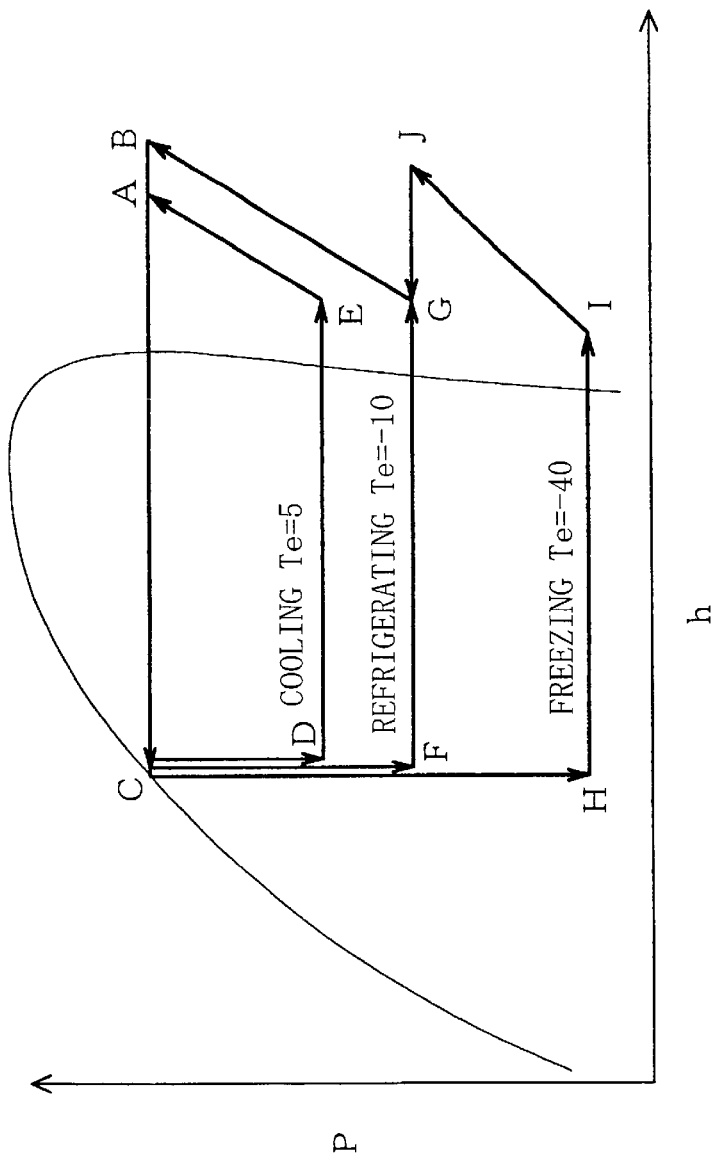
FIG. 11 is a Mollier chart illustrating a freezing cycle.

Subsequently, explanation will be made on a freezing cycle during the cooling/freezing operation in reference to FIG. 11.

The refrigerant sucked by the second inverter compressor (2C) is compressed up to a point A. Furthermore, the refrigerant is compressed up to a point B by the non-inverter compressor (2A) and the first inverter compressor (2B). The refrigerant at the point A and the refrigerant at the point B are converged together, to be thus condensed into a refrigerant at a point C. A part of the refrigerant at the point C is reduced in pressure down to a point D by the inside expanding valve (42), and then, is evaporated at, for example, ±5° C., and thus, is sucked at a point E by the second inverter compressor (2C).

Moreover, a part of the refrigerant at the point C is reduced in pressure down to a point F by the refrigerating expanding valve (46), and then, is evaporated at, for example, −10° C., and thus, is sucked at a point G by the non-inverter compressor (2A) and the first inverter compressor (2B).

Additionally, another part of the refrigerant at the point C is reduced in pressure down to a point H by the freezing expanding valve (52), and then, is evaporated at, for example, −40° C., and thus, is sucked at a point I by the booster compressor (53). The refrigerant compressed up to a point J by the booster compressor (53) is sucked at the point G by the non-inverter compressor (2A) and the first inverter compressor (2B).

In this manner, the refrigerant in the refrigerant circuit (1E) is compressed by the compressor mechanism (2D) of the first system, the compressor mechanism (2E) of the second system and the booster compressor (53), and therefore, is evaporated at the three kinds, in total, of evaporation temperatures.

Cooling/Freezing Operation in Case of Breakdown of Compressor

In the present refrigeration apparatus (1), if either one of the non-inverter compressor (2A) and the first inverter compressor (2B) is broken down during the above-described cooling/freezing operation, the solenoid valve (7a) of the first sub pipe (23) is opened, thereby continuing the cooling/freezing operation.

Figure 12:
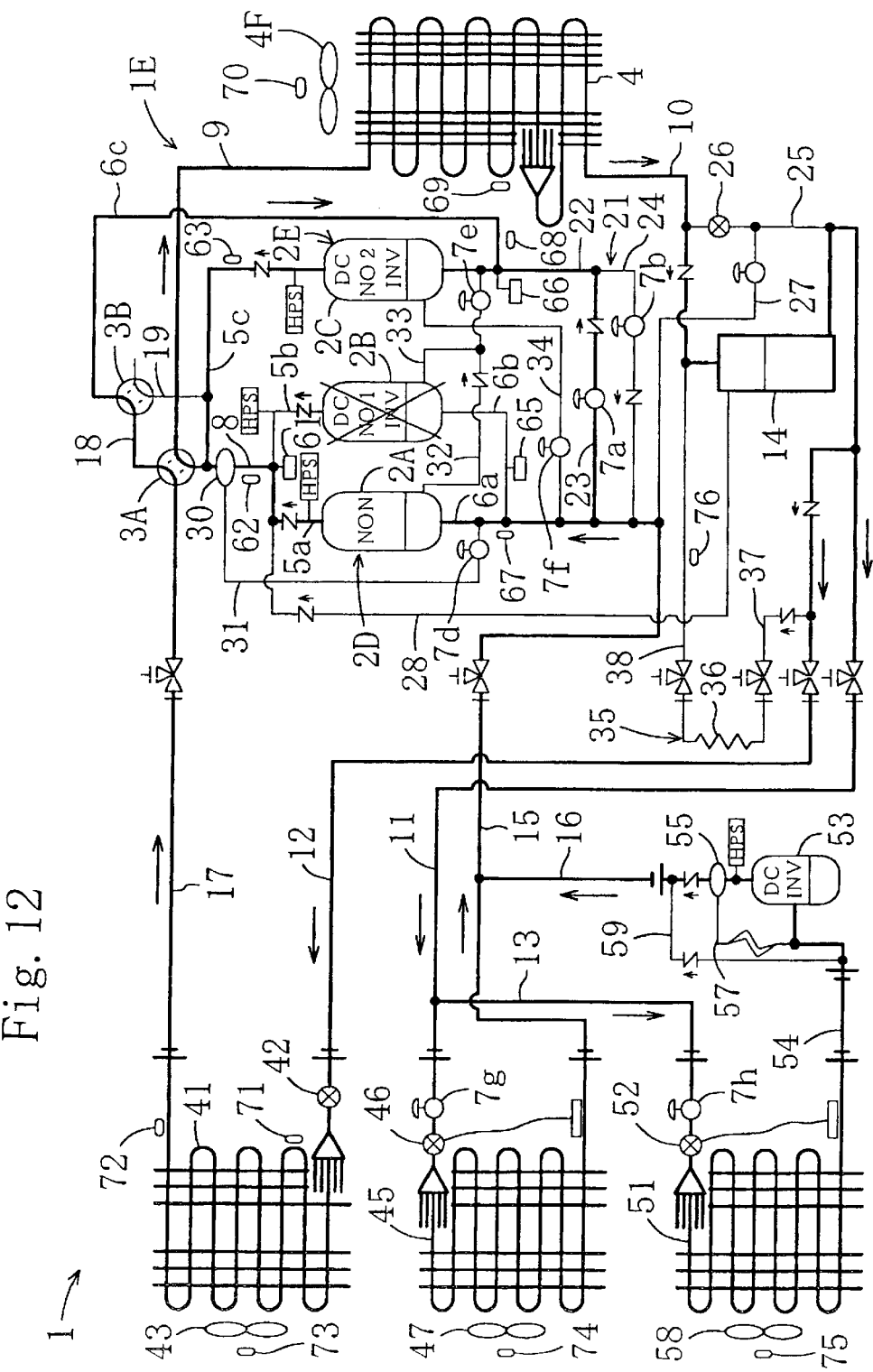
FIG. 12 is a refrigerant circuit diagram illustrating a refrigerant circulation during the cooling/freezing operation in the case where a compressor is broken down.

For example, if the first inverter compressor (2B) is broken down during the cooling/freezing operation, the controller (80) detects the breakdown, and then, stops the operation of the compressor (2B) while opens the solenoid valve (7a). Consequently, the refrigerant circulates as illustrated in FIG. 12.

In other words, the refrigerant discharged from the non-inverter compressor (2A) and the second inverter compressor (2C) is condensed in the outside heat exchanger (4), and then, is diverged to flow into the inside unit (1B), the refrigerating unit (1C) and the freezing unit (1D). In the same manner as in the above-described cooling/freezing operation, the refrigerant flowing into the refrigerating unit (1C) and the freezing unit (1D) is expanded by the refrigerating expanding valve (46) and the freezing expanding valve (52), respectively, and then, is evaporated in the refrigerating heat exchanger (45) and the freezing heat exchanger (51), respectively. In the meantime, the refrigerant flowing into the inside unit (1B) is expanded by the inside expanding valve (42), and then, is evaporated in the inside heat exchanger (41).

Here, since the solenoid valve (7a) is opened, the suction side of the non-inverter compressor (2A) and the suction side of the second inverter compressor (2C) communicate with each other via the first sub pipe (23). Therefore, in the present operation, the suction pressure of the non-inverter compressor (2A) and the suction pressure of the second inverter compressor (2C) become equal to each other. As a result, unlike the cooling/freezing operation in the case where no compressor is broken down, the pressure of the refrigerant in the inside heat exchanger (41) becomes equal to that of the refrigerant in the refrigerating heat exchanger (45). Consequently, the evaporation temperature of the refrigerant in the inside heat exchanger (41) becomes equal to that of the refrigerant in the refrigerating heat exchanger (45), so that the cooling temperature of the inside heat exchanger (41) becomes lower than that before the breakdown of the compressor.

The number of operating compressors is reduced from three to two caused by the breakdown of the first inverter compressor (2B), thereby reducing the entire quantity of the refrigerant circulating in the refrigerant circuit (1E). However, since the evaporation temperature of the refrigerant in the inside heat exchanger (41) is decreased in the present operation, it is sufficient that the circulating refrigerant quantity required for maintaining the cooling performance of the inside heat exchanger (41) is small. Thus, the cooling/freezing operation can be continued without degrading the cooling performance of each of the refrigerating heat exchanger (45) and the freezing heat exchanger (51) and the cooling performance of the inside heat exchanger (41).

Figure 13:
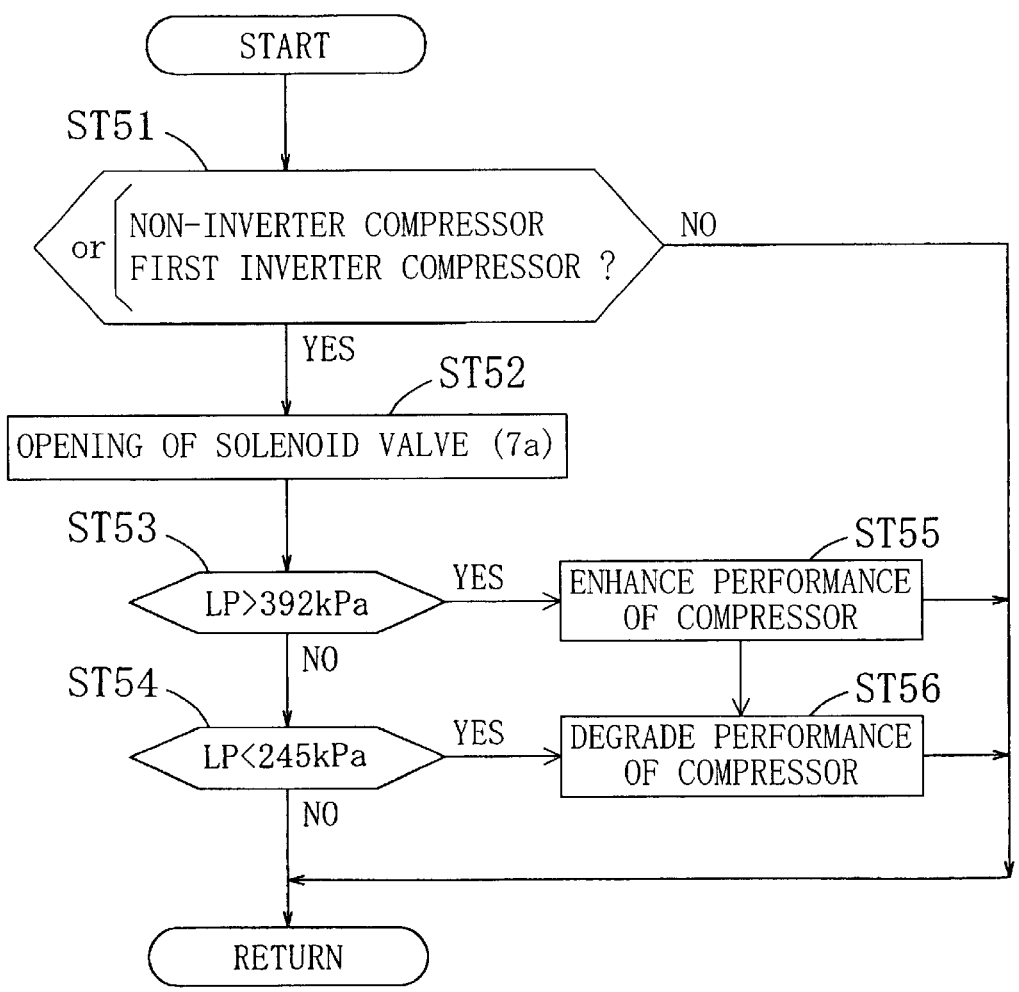
FIG. 13 is a flowchart illustrating the control of the cooling/freezing operation in the case where the compressor is broken down.

In the present operation, control is carried out as illustrated in FIG. 13. That is to say, first, it is judged in step ST51 whether or not the non-inverter compressor (2A) or the first inverter compressor (2B) is broken down. If the judgement result is YES, the control proceeds to step ST52, in which the solenoid valve (7a) is opened. Subsequently, it is judged in step ST53 whether or not the pressure LP of the low pressure refrigerant is higher than 392 kPa. If the judgement result is YES, the performance of the compressor is enhanced in ST55, and then, the control is returned. In contrast, if the judgement result in step ST53 is NO, the control proceeds to step ST54, in which it is judged whether or not the pressure LP of the low pressure refrigerant is lower than 245 kPa. If the judgement result is YES, the control proceeds to step ST56, in which the performance of the compressor is degraded, and then, the control is returned. In contrast, if the judgement result in step ST54 is NO, the control is returned as it is.

In the present refrigeration apparatus (1), if the second inverter compressor (2C) is broken down during the above-described cooling/freezing operation, the solenoid valve (7b) of the second sub pipe (24) is appropriately opened, thereby continuing the cooling/freezing operation.

Figure 14:
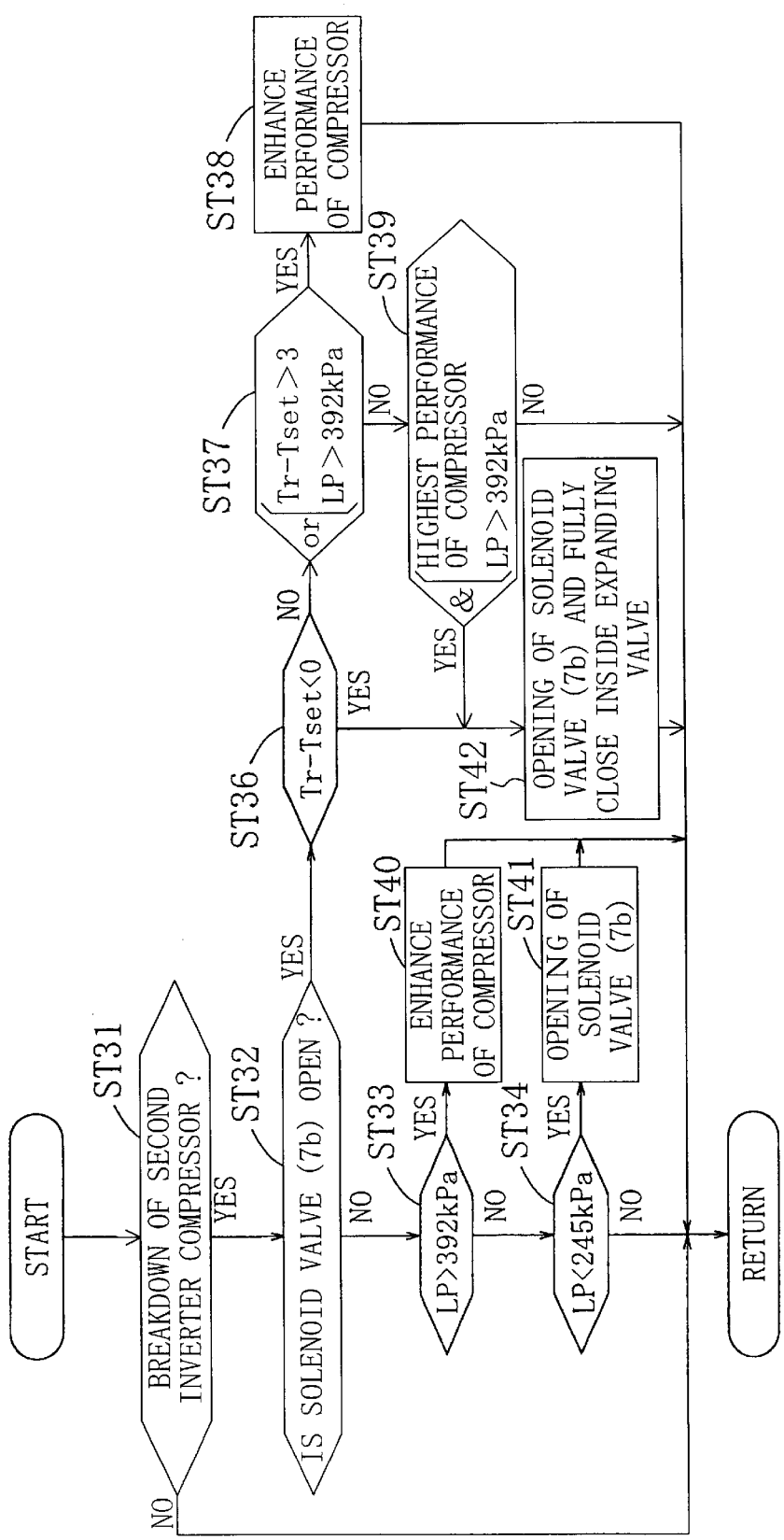
FIG. 14 is a flowchart illustrating the control of the cooling/freezing operation in the case where the compressor is broken down.

Specifically, control is carried out as illustrated in FIG. 14. That is to say, first, it is judged in step ST31 whether or not the second inverter compressor (2C) is broken down. If the judgement result is YES, the control proceeds to step ST32. In step ST32, it is judged whether or not the solenoid valve (7b) of the second sub pipe (24) is opened. If the judgement result in step ST32 is NO, the control proceeds to step ST33, in which it is judged whether or not the pressure LP of the low pressure refrigerant is higher than 392 kPa. If the judgement result in step ST33 is NO, the control proceeds to step ST34, in which it is judged whether or not the pressure LP of the low pressure refrigerant is lower than 245 kPa. If the judgement result in step ST34 is NO, the control is returned.

If the judgement result in step ST32 is YES, it is judged in step ST36 whether or not a condition of (the inside temperature Tr—the setting temperature Tset)<0° C. is satisfied. If the judgement result is YES, it is judged that it is unnecessary to cool the inside of the store since the inside temperature is lower than the setting temperature, and then, the control proceeds to step ST42, in which the solenoid valve (7b) is closed, and further, the inside expanding valve (42) is closed, and finally, the control is returned. In contrast, if the judgement result in step ST36 is NO, the control proceeds to step ST37.

In step ST37, it is judged whether or not a condition of (the inside temperature Tr—the setting temperature Tset)>3° C. or the pressure LP of the low pressure refrigerant>392 kPa is satisfied. If the judgement result is YES, the control proceeds to step ST38, in which the performance of the compressor is enhanced, and finally, the control is returned. In contrast, if the judgement result in step ST37 is NO, the control proceeds to step ST39, in which it is judged whether or not a condition of the highest performance of the compressor and the pressure LP of the low pressure refrigerant>392 kPa is satisfied. If the judgement result in step ST39 is YES, the control proceeds to step ST42; in contrast, if the judgement result in step ST39 is NO, the control is returned.

In the meantime, if the judgement result in step ST33 is YES, the control proceeds to step ST40, in which the performance of the compressor is enhanced, and finally, the control is returned. In contrast, if the judgement result in step ST34 is YES, the control proceeds to step ST41, in which the solenoid valve (7b) is opened, and then, the control is returned.

As described above, according to the present refrigeration apparatus (1), even if one of the compressors is broken down during the cooling/freezing operation, the cooling/freezing operation can be continued as it is without stopping the cooling/freezing operation and inducing insufficient cooling and freezing performances.

Warming Operation

In a warming operation, the inside unit (1B) and the floor warming circuit (35) are actuated to perform only a warming operation. During the warming operation, the non-inverter compressor (2A) constitutes the compressor mechanism (2D) of the first system while the first inverter compressor (2B) and the second inverter compressor (2C) constitute the compressor mechanism (2E) of the second system, as illustrated in FIG. 15, and only the first inverter compressor (2B) and the second inverter compressor (2C) constituting the compressor mechanism (2E) of the second system are driven.

Figure 15:
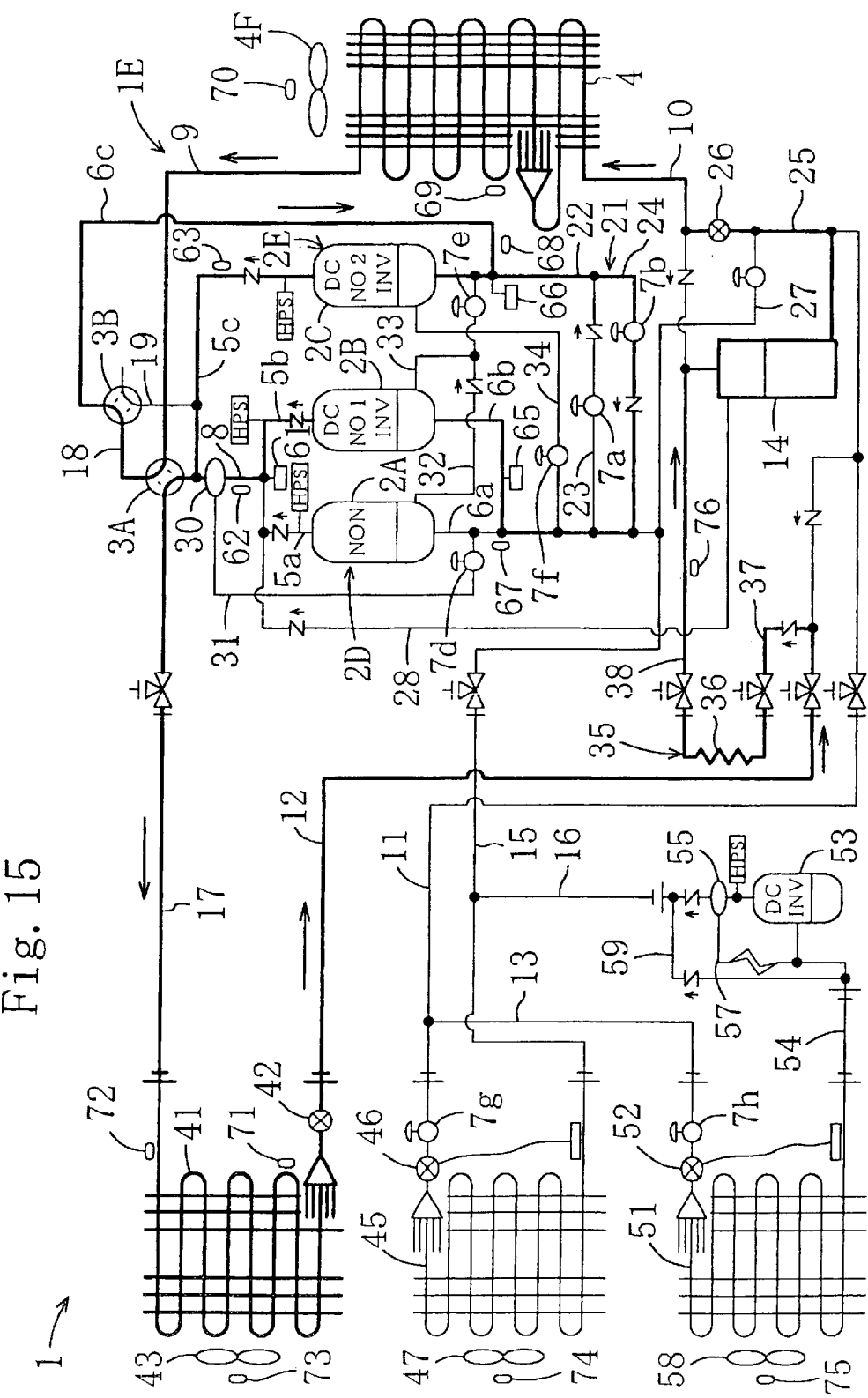
FIG. 15 is a refrigerant circuit diagram illustrating a refrigerant circulation during a warming operation.

As indicated by a solid line in FIG. 15, the first 4-way switch valve (3A) is switched to the second state, and further, the second 4-way switch valve (3B) is switched to the first state. The solenoid valve (7b) disposed on the second sub pipe (24) of the communicating pipe (21) is opened. In the meantime, the solenoid valve (7a) disposed on the first sub pipe (23) of the communicating pipe (21), the solenoid valve (7g) in the refrigerating unit (1C) and the solenoid valve (7h) in the freezing unit (1D) are closed.

In this state, the refrigerant discharged from the first inverter compressor (2B) and the second inverter compressor (2C) is condensed in the inside heat exchanger (41) from the first 4-way switch valve (3A) via the connecting gas pipe (17). The condensed liquid refrigerant flows in the second connecting liquid pipe (12) and the floor warming circuit (35), and further, flows into the receiver (14) via the floor warming heat exchanger (36). Thereafter, the liquid refrigerant is evaporated in the outside heat exchanger (4) via the outside expanding valve (26) of the auxiliary liquid pipe (25). The evaporated gaseous refrigerant flows into the suction pipe (6c) of the second inverter compressor (2C) via the first 4-way switch valve (3A) and the second 4-way switch valve (3B), and then, returns to the first inverter compressor (2B) and the second inverter compressor (2C). The inside of the room, i.e., the inside of the store and the floor are warmed by repeating the above-described circulation of the refrigerant.

Figure 16:
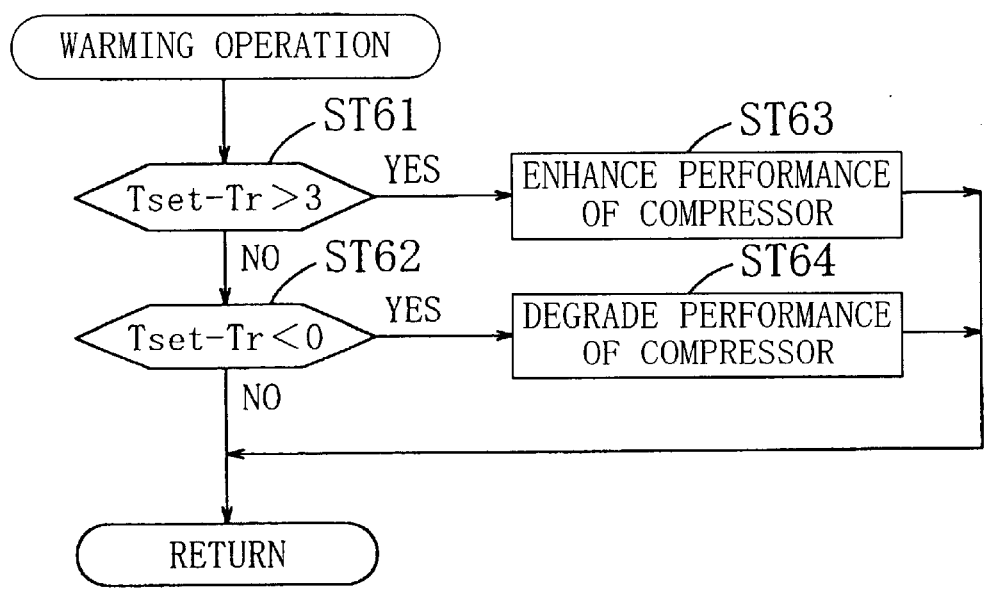
FIG. 16 is a flowchart illustrating the control of the warming operation.

During this warming operation, the capacity of the compressor is controlled as illustrated in FIG. 16. This control is relevant to two judgements, as follows: in step ST61, it is judged whether or not a first condition of (the setting temperature Tset—the inside temperature Tr)>3° C. is satisfied; and in step ST62, it is judged whether or not a second condition of (the setting temperature Tset—the inside temperature Tr)<0° C. is satisfied.

If it is judged in step ST61 that the first condition is satisfied, the control proceeds to step ST63, in which the performance of the first inverter compressor (2B) or the second inverter compressor (2C) is enhanced, and then, the control is returned. In contrast, if it is judged in step ST61 that the first condition is not satisfied but it is judged in step ST62 that the second condition is satisfied, the control proceeds to step ST64, in which the performance of the first inverter compressor (2B) or the second inverter compressor (2C) is degraded, and then, the control is returned. Furthermore, if it is judged in step ST12 that the second condition is not satisfied, it is found that the current performance of the compressor is sufficient. Therefore, the control is returned, and then, the above-described processing is repeated. The capacity of the compressor is increased or decreased in accordance with the above-described first capacity control (see FIG. 4).

The opening degree of the outside expanding valve (26) is controlled by overheating based on pressure equivalent saturation temperatures detected by the low pressure sensors (65) and (66) and temperatures detected by the suction temperature sensors (67) and (68). The opening degree of the inside expanding valve (42) is controlled by overcooling based on temperatures detected by the inside heat exchange temperature sensor (71) and the liquid temperature sensor (76).

Warming Operation in Case of Breakdown of Compressor

In the present refrigeration apparatus (1), if either one of the first inverter compressor (2B) and the second inverter compressor (2C) is broken down during the above-described warming operation, the non-inverter compressor (2A) is driven in place of the broken compressor, so that the warming operation can be continued.

Figure 17:
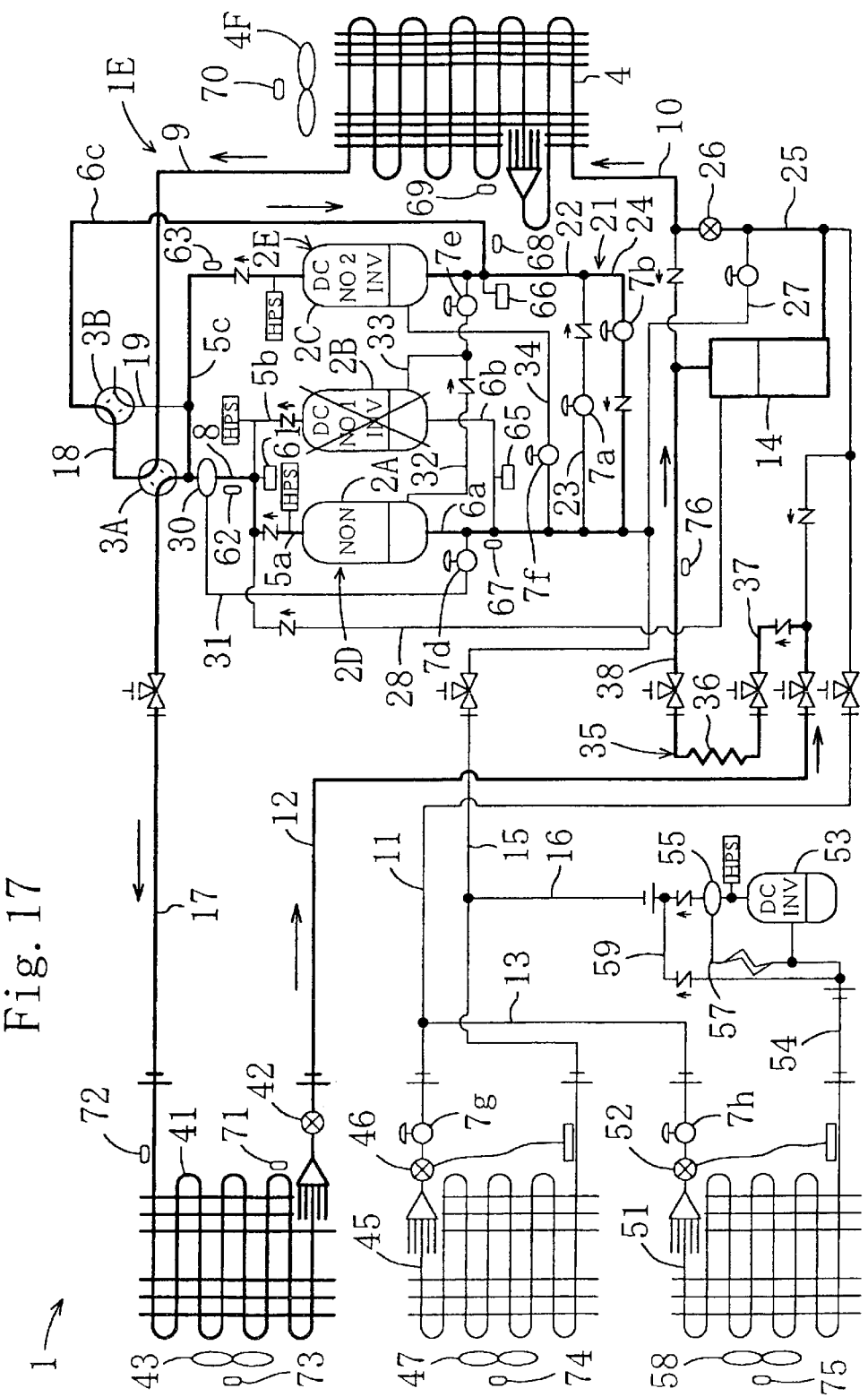
FIG. 17 is a refrigerant circuit diagram illustrating a refrigerant circulation during the warming operation in the case where a compressor is broken down.

For example, if the first inverter compressor (2B) is broken down during the warming operation, the controller (80) detects the breakdown, and then, stops the operation of the compressor (2B) while starts the non-inverter compressor (2A), which has not been operated. Consequently, the refrigerant circulates as illustrated in FIG. 17. In other words, a circulating operation is performed such that the refrigerant discharged from the non-inverter compressor (2A) and the second inverter compressor (2C) is condensed in the inside heat exchanger (41) and the floor warming heat exchanger (36), is expanded by the outside expanding valve (26), is evaporated in the outside heat exchanger (4), and finally, returns to the non-inverter compressor (2A) and the second inverter compressor (2C).

The capacity of the compressor is increased or decreased in the present operation in accordance with the above-described second capacity control (see FIG. 6).

Incidentally, even if the second inverter compressor (2C) is accidentally broken down, the warming operation can be continued in the same manner as described above by actuating the non-inverter compressor (2A) in place of the second inverter compressor (2C).

As described above, according to the present refrigeration apparatus (1), even if one of the compressors is broken down during the warming operation, the warming operation can be continued as it is without stopping the warming operation and inducing any insufficient warming performance.

Warming/Freezing Operation

Figure 18:
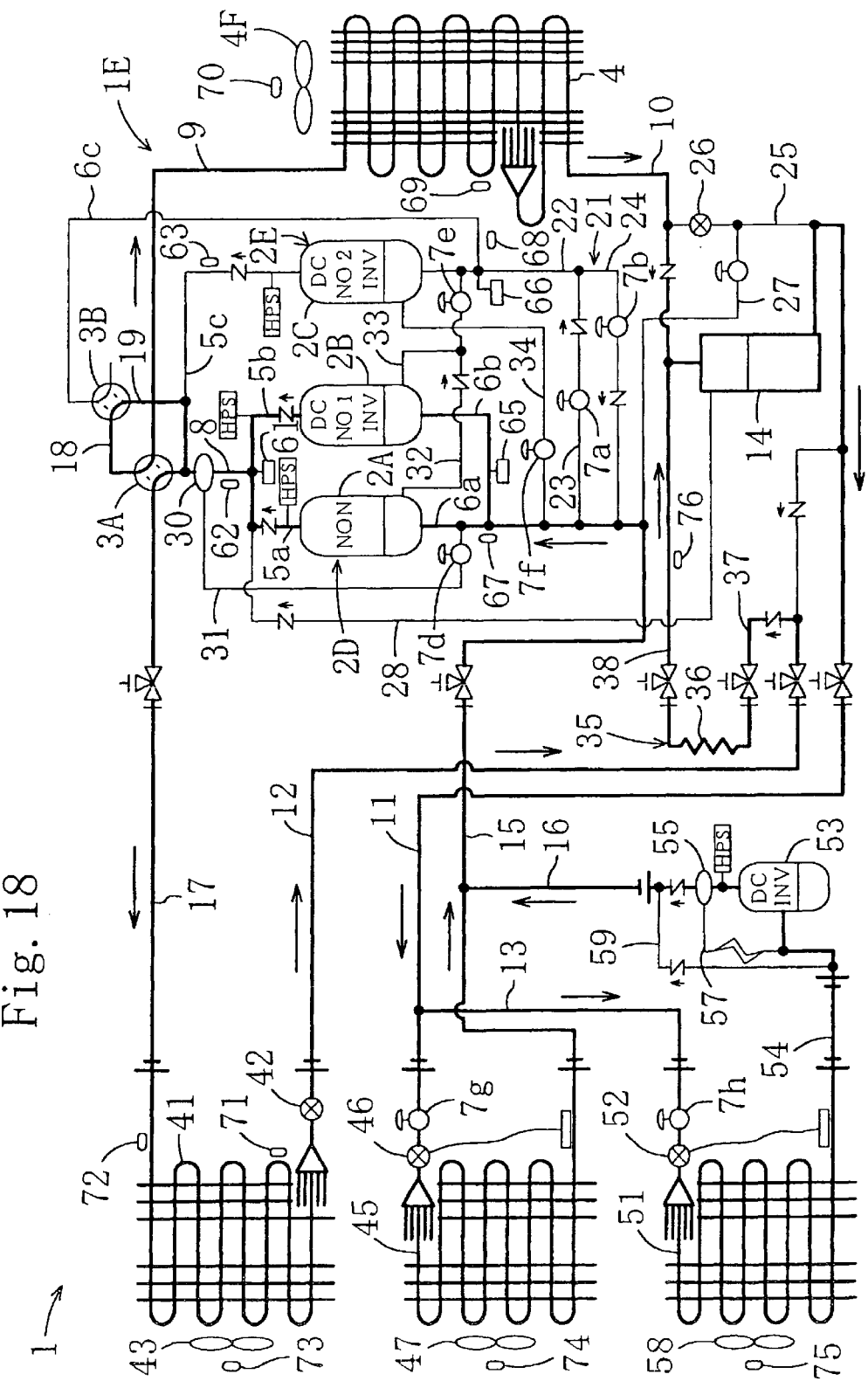
FIG. 18 is a refrigerant circuit diagram illustrating a refrigerant circulation during a warming/freezing operation.

In a warming/freezing operation, the non-inverter compressor (2A) and the first inverter compressor (2B) constitute the compressor mechanism (2D) of the first system while the second inverter compressor (2C) constitutes the compressor mechanism (2E) of the second system, as illustrated in FIG. 18. The non-inverter compressor (2A) and the first inverter compressor (2B) are driven, and, further, the booster compressor (53) also is driven. The second inverter compressor (2C) is inoperative.

As indicated by a solid line in FIG. 18, the first 4-way switch valve (3A) is switched to the second state, and further, the second 4-way switch valve (3B) is switched to the second state. The solenoid valve (7g) in the refrigerating unit (1C) and the solenoid valve (7h) in the freezing unit (1D) are opened. In the meantime, the two solenoid valves (7a) and (7b) disposed on the communicating pipe (21) and the outside expanding valve (26) are closed.

A part of the refrigerant discharged from the non-inverter compressor (2A) and the first inverter compressor (2B) is condensed in the inside heat exchanger (41). The condensed liquid refrigerant flows in the floor warming circuit (35), and further, flows into the liquid pipe (10) via the floor warming heat exchanger (36).

In the meantime, the residual refrigerant discharged from the non-inverter compressor (2A) and the first inverter compressor (2B) flows in the outside gas pipe (9) from the auxiliary gas pipe (19) via the second 4-way switch valve (3B) and the first 4-way switch valve (3A), and then, is condensed in the outside heat exchanger (4). The condensed liquid refrigerant flows in the liquid pipe (10), and then, is converged with the liquid refrigerant from the floor warming circuit (35). Thereafter, the liquid refrigerant flows into the receiver (14), and then, in the first connecting liquid pipe (11).

A part of the liquid refrigerant flowing in the first connecting liquid pipe (11) is evaporated in the refrigerating heat exchanger (45). Furthermore, the residual liquid refrigerant flowing in the first connecting liquid pipe (11) is evaporated in the freezing heat exchanger (51). The gaseous refrigerant evaporated in the refrigerating heat exchanger (45) and the gaseous refrigerant discharged from the booster compressor (53) are converged together in the low pressure gas pipe (15), and then, return to the non-inverter compressor (2A) and the first inverter compressor (2B). By repeating the above-described circulation of the refrigerant, the inside of the room, i.e., the inside of the store and the floor are warmed, and at the same time, the inside of the refrigerating show case and the inside of the freezing show case are cooled.

Figure 19:
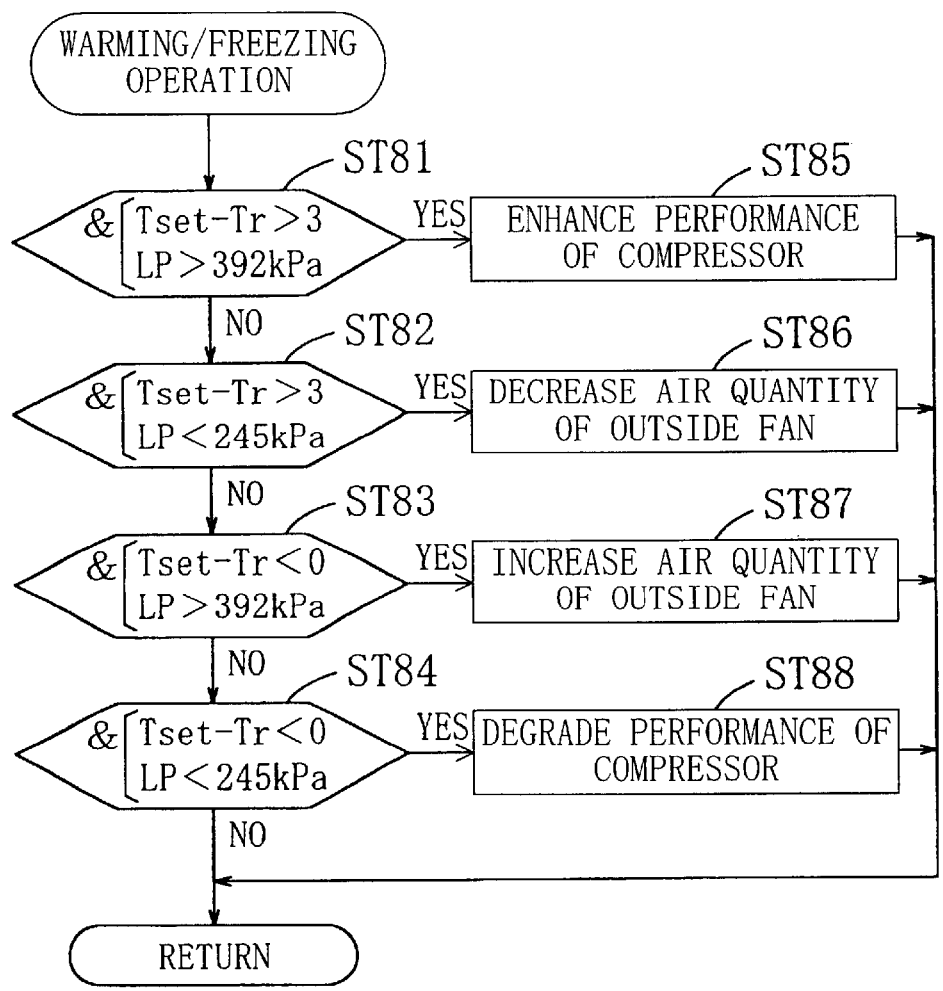
FIG. 19 is a flowchart illustrating the control of the warming/freezing operation.

During this warming/freezing operation, the capacity of the compressor and the air quantity of the outside fan (4F) are controlled as illustrated in FIG. 19. This control is relevant to four judgements, as described below.

That is to say, in step ST81, it is judged whether or not a first condition of (the setting temperature Tset−the inside temperature Tr)>3° C. and the pressure LP of the low pressure refrigerant>392 kPa is satisfied. In step ST82, it is judged whether or not a second condition of (the setting temperature Tset−the inside temperature Tr)>3° C. and the pressure LP of the low pressure refrigerant<245 kPa is satisfied. In step ST83, it is judged whether or not a third condition of (the setting temperature Tset−the inside temperature Tr)<0° C. and the pressure LP of the low pressure refrigerant>392 kPa is satisfied. In step ST84, it is judged whether or not a fourth condition of (the setting temperature Tset−the inside temperature Tr)<0° C. and the pressure LP of the low pressure refrigerant<245 kPa is satisfied.

If it is judged in step ST81 that the first condition is satisfied, the control proceeds to step ST85, in which the performance of the first inverter compressor (2B) or the non-inverter compressor (2A) is enhanced; and then, the control is returned. In contrast, if it is judged in step ST81 that the first condition is not satisfied but it is judged in step ST82 that the second condition is satisfied, the control proceeds to step ST86, in which the air quantity of the outside fan (4F) is decreased, and then, the control is returned. In other words, since the warming performance is slightly insufficient, the condensed heat in the outside heat exchanger (4) is applied to the inside heat exchanger (41). Furthermore, if it is judged in step ST82 that the second condition is not satisfied but it is judged in step ST83 that the third condition is satisfied, the control proceeds to step ST87, in which the air quantity of the outside fan (4F) is increased, and then, the control is returned. In other words, since the warming performance is slightly excessive, the condensed heat in the inside heat exchanger (41) is applied to the outside heat exchanger (4). Moreover, if it is judged in step ST83 that the third condition is not satisfied but it is judged in step ST84 that the fourth condition is satisfied, the control proceeds to step ST88, in which the performance of the first inverter compressor (2B) or the non-inverter compressor (2A) is degraded, and then, the control is returned. Additionally, if it is judged in step ST84 that the fourth condition is satisfied, since the current performance of the compressor is sufficient, the control is returned. The above-described processing is repeated. The capacity of the compressor is controlled to be increased or decreased in accordance with the second capacity control (see FIG. 6).

Warming/Freezing Operation in Case of Breakdown of Compressor

In the present refrigeration apparatus (1), if the non-inverter compressor (2A) or the first inverter compressor (2B) is broken down during the above-described warming/freezing operation, the second inverter compressor (2C) is driven in place of the broken compressor, and further, the solenoid valve (7a) of the first sub pipe (23) is opened, thereby continuing the warming/freezing operation.

Figure 20:
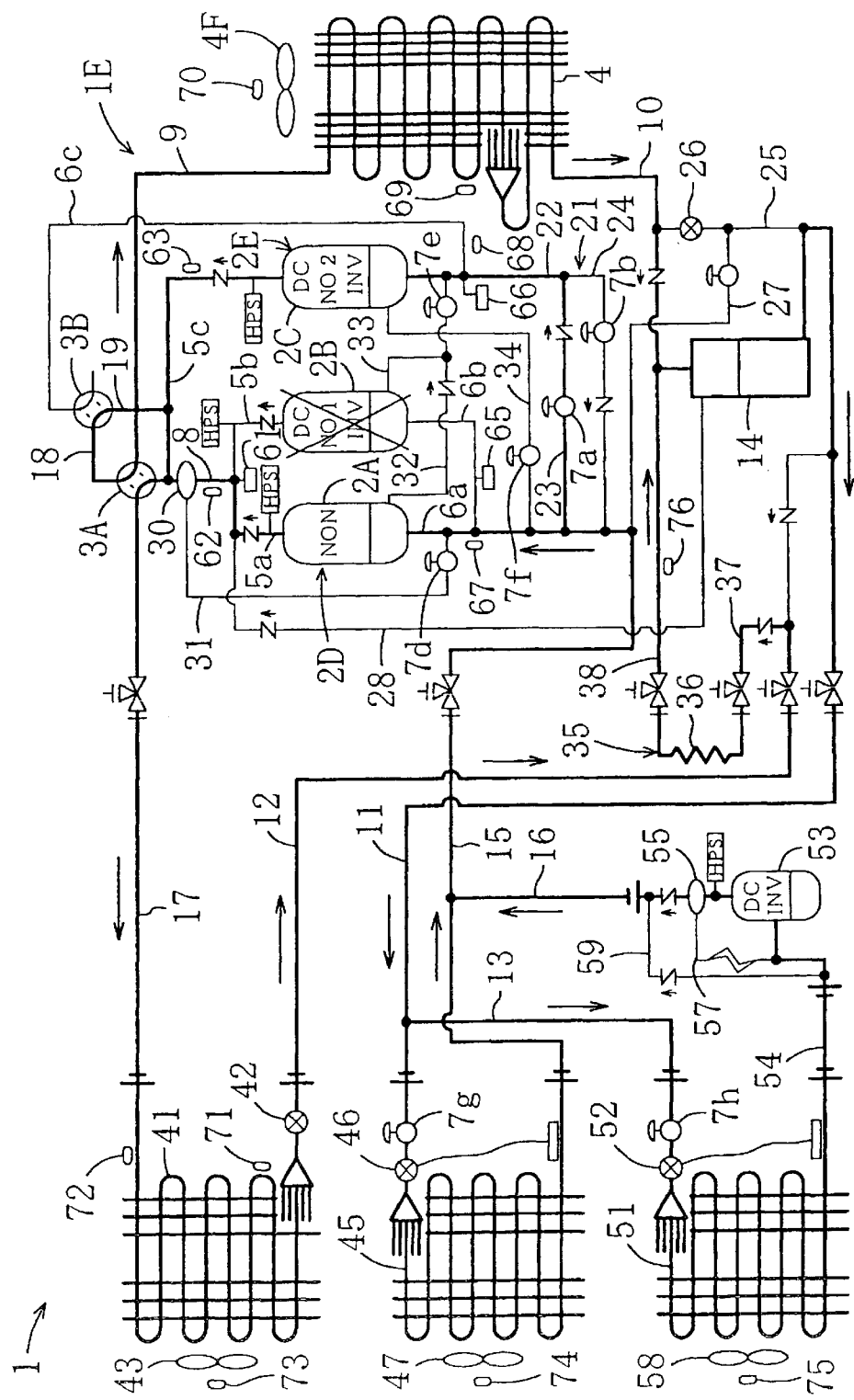
FIG. 20 is a refrigerant circuit diagram illustrating a refrigerant circulation during the warming/freezing operation in the case where a compressor is broken down.

For example, if the first inverter compressor (2B) is broken down during the warming/freezing operation, the controller (80) detects the breakdown, and then, stops the operation of the compressor (2B) while starts the second inverter compressor (2C), which has not been operated, and further, opens the solenoid valve (7a). Consequently, the refrigerant circulates as illustrated in FIG. 20. In other words, a part of the refrigerant discharged from the non-inverter compressor (2A) and the second inverter compressor (2C) is condensed in the inside heat exchanger (41) and the floor warming heat exchanger (36). In the meantime, the residual refrigerant discharged from the non-inverter compressor (2A) and the second inverter compressor (2C) is condensed in the outside heat exchanger (4). The condensed liquid refrigerant is converged with the refrigerant from the floor warming heat exchanger (36), and then, flows into the receiver (14). The refrigerant from the receiver (14) is evaporated in the refrigerating heat exchanger (45) and the freezing heat exchanger (51), and then, returns to the non-inverter compressor (2A) and the second inverter compressor (2C). The capacity of each of the non-inverter compressor (2A) and the second inverter compressor (2C) is controlled in accordance with the second capacity control (see FIG. 6).

Incidentally, even if the non-inverter compressor (2A) is accidentally broken down, the warming/freezing operation can be continued in the same manner as described above by actuating the second inverter compressor (2C) in place of the non-inverter compressor (2A).

As described above, according to the present refrigeration apparatus (1), even if one of the compressors is broken down during the warming/freezing operation, the warming/freezing operation can be continued as it is without stopping the warming/freezing operation and inducing insufficient warming performance and insufficient freezing performance.

Other Preferred Embodiments

The refrigeration apparatus according to the present invention is not limited to a type comprising the three compressors, and therefore, it may comprise four or more compressors.

Although "the first compressor", "the second compressor" and "the third compressor" according to the present invention may correspond to the non-inverter compressor (2A), the first inverter compressor (2B) and the second inverter compressor (2C) in the above-described preferred embodiment, respectively, the corresponding relationship may be different: for example, the non-inverter compressor (2A) or the second inverter compressor (2C) corresponds to "the second compressor" according to the present invention. That is to say, their corresponding relationships are not limited in particular.

AVAILABILITY OF INDUSTRIAL UTILIZATION

As described above, the refrigeration apparatus according to the present invention is usable in a refrigeration apparatus which can freely perform both of the air-conditioning and freezing operations.

What is claimed is:

1. A refrigeration apparatus comprising:
   a refrigerant circuit (1E) including first, second and third compressors (2A, 2B, 2C) connected in parallel each other, a heat source side heat exchanger (4), an air-conditioning heat exchanger (41) for air-conditioning the inside of a room, a cooling heat exchanger (45, 51) for cooling the inside of a cold store, and first and second expanding mechanisms (42, 46, 52) for expanding a refrigerant; and
   breakdown detecting means (80) for detecting the breakdown of at least the second compressor (2B);
   the refrigeration apparatus being capable of freely performing at least a cooling operation and a freezing operation,
   wherein the cooling operation is performed by actuating the second compressor (2B) and the third compressor (2C), the cooling operation being achieved by condensing a refrigerant discharged from the second compressor (2B) and the third compressor (2C) by means of the heat source side heat exchanger (4), expanding it by the first expanding mechanism (42), evaporating it by the air-conditioning heat exchanger (41), and returning it to the second compressor (2B) and the third compressor (2C), and further,
   the freezing operation is performed by actuating the first compressor (2A) and the second compressor (2B), the freezing operation being achieved by condensing a refrigerant discharged from the first compressor (2A) and the second compressor (2B) by means of the heat source side heat exchanger (4), expanding it by the second expanding mechanism (46, 52), evaporating it by the cooling heat exchanger (45, 51), and returning it to the first compressor (2A) and the second compressor (2B); and
   the cooling operation being continued by actuating the first compressor (2A) in place of the second compressor (2B) if the breakdown of the second compressor (2B) is detected during the cooling operation.

2. A refrigeration apparatus comprising:
   a refrigerant circuit (1E) including first, second and third compressors (2A, 2B, 2C) connected in parallel each other, a heat source side heat exchanger (4), an air-conditioning heat exchanger (41) for air-conditioning the inside of a room, a cooling heat exchanger (45, 51) for cooling the inside of a cold store, and first and second expanding mechanisms (42, 46, 52) for expanding a refrigerant; and
   breakdown detecting means (80) for detecting the breakdown of at least the second compressor (2B);
   the refrigeration apparatus being capable of freely performing at least a freezing operation and a cooling/freezing operation,
   wherein the freezing operation is performed by actuating the first compressor (2A) and the second compressor (2B), the freezing operation being achieved by condensing a refrigerant discharged from the first compressor (2A) and the second compressor (2B) by means of the heat source side heat exchanger (4), expanding it by the second expanding mechanism (46, 52), evaporating it by the cooling heat exchanger (45, 51), and returning it to the first compressor (2A) and the second compressor (2B), and further,
   the cooling/freezing operation is performed by actuating the first compressor (2A), the second compressor (2B) and the third compressor (2C), the cooling/freezing operation being achieved by condensing a refrigerant discharged from the first compressor (2A), the second compressor (2B) and the third compressor (2C) by means of the heat source side heat exchanger (4), reducing the pressure of a part of the condensed refrigerant down to a first low pressure by the first expanding mechanism (42), evaporating it by the air-conditioning heat exchanger (41), and returning it to the third compressor (2C) while reducing the pressure of the residual condensed refrigerant down to a second low pressure lower than the first low pressure by the second expanding mechanism (46, 52), evaporating it by the cooling heat exchanger (45, 51), and returning it to the first compressor (2A) and the second compressor (2B);
   the refrigerant circuit (1E) further including a refrigerant pipeline (23) for introducing the refrigerant from pipelines on the suction sides of the first compressor (2A) and the second compressor (2B) to a pipeline on the suction side of the third compressor (2C), and channel switching means (7a) disposed on the refrigerant pipeline (23); and
   the freezing operation being continued by opening the channel switching means (7a), and further, actuating the third compressor (2C) in place of the second compressor (2B) if the breakdown of the second compressor (2B) is detected during the freezing operation.

3. A refrigeration apparatus comprising:
   a refrigerant circuit (1E) including first, second and third compressors (2A, 2B, 2C) connected in parallel each other, a heat source side heat exchanger (4), an air-conditioning heat exchanger (41) for air-conditioning the inside of a room, a cooling heat exchanger (45, 51)

for cooling the inside of a cold store, and first and second expanding mechanisms (42, 46, 52) for expanding a refrigerant; and breakdown detecting means (80) for detecting the breakdown of at least the second compressor (2B);

the refrigeration apparatus being capable of freely performing at least a freezing operation and a cooling/freezing operation, wherein the freezing operation is performed by actuating the first compressor (2A) and the second compressor (2B), the freezing operation being achieved by condensing a refrigerant discharged from the first compressor (2A) and the second compressor (2B) by means of the heat source side heat exchanger (4), expanding it by the second expanding mechanism (46, 52), evaporating it by the cooling heat exchanger (45, 51), and returning it to the first compressor (2A) and the second compressor (2B), and further, the cooling/freezing operation is performed by actuating the first compressor (2A), the second compressor (2B) and the third compressor (2C), the cooling/freezing operation being achieved by condensing a refrigerant discharged from the first compressor (2A), the second compressor (2B) and the third compressor (2C) by means of the heat source side heat exchanger (4), reducing the pressure of a part of the condensed refrigerant down to a first low pressure by the first expanding mechanism (42), evaporating it by the air-conditioning heat exchanger (41), and returning it to the third compressor (2C) while reducing the pressure of the residual condensed refrigerant down to a second low pressure lower than the first low pressure by the second expanding mechanism (46, 52), evaporating it by the cooling heat exchanger (45, 51), and returning it to the first compressor (2A) and the second compressor (2B);

the refrigerant circuit (1E) further including a refrigerant pipeline (23) for introducing the refrigerant from pipelines on the suction sides of the first compressor (2A) and the second compressor (2B) to a pipeline on the suction side of the third compressor (2C), and channel switching means (7a) disposed on the refrigerant pipeline (23); and the cooling/freezing operation being continued by opening the channel switching means (7a), and further, by condensing the refrigerant discharged from the first compressor (2A) and the third compressor (2C) by means of the heat source side heat exchanger (4) on the side of the heat source, reducing the pressure down to a predetermined pressure lower than the first low pressure by the first expanding mechanism (42) and the second expanding mechanism (46, 52), respectively, evaporating it by the air-conditioning heat exchanger (41) and the cooling heat exchanger (45, 51), and returning it to the first compressor (2A) and the third compressor (2C) if the breakdown of the second compressor (2B) is detected during the cooling/freezing operation.

4. A refrigeration apparatus comprising:

a refrigerant circuit (1E) including first, second and third compressors (2A, 2B, 2C) connected in parallel each other, a heat source side heat exchanger (4), an air-conditioning heat exchanger (41) for air-conditioning the inside of a room, a cooling heat exchanger (45, 51) for cooling the inside of a cold store, and first and second expanding mechanisms (42, 46, 52) for expanding a refrigerant; and breakdown detecting means (80) for detecting the breakdown of at least the third compressor (2C);

the refrigeration apparatus being capable of freely performing at least a freezing operation and a cooling/freezing operation, wherein the freezing operation is performed by actuating the first compressor (2A) and the second compressor (2B), the freezing operation being achieved by condensing a refrigerant discharged from the first compressor (2A) and the second compressor (2B) by means of the heat source side heat exchanger (4), expanding it by the second expanding mechanism (46, 52), evaporating it by the cooling heat exchanger (45, 51), and returning it to the first compressor (2A) and the second compressor (2B), and further, the cooling/freezing operation is performed by actuating the first compressor (2A), the second compressor (2B) and the third compressor (2C), the cooling/freezing operation being achieved by condensing a refrigerant discharged from the first compressor (2A), the second compressor (2B) and the third compressor (2C) by means of the heat source side heat exchanger (4), reducing the pressure of a part of the condensed refrigerant down to a first low pressure by the first expanding mechanism (42), evaporating it by the air-conditioning heat exchanger (41), and returning it to the third compressor (2C) while reducing the pressure of the residual condensed refrigerant down to a second low pressure lower than the first low pressure by the second expanding mechanism (46, 52), evaporating it by the cooling heat exchanger (45, 51), and returning it to the first compressor (2A) and the second compressor (2B);

the refrigerant circuit (1E) further including a refrigerant pipeline (24) for introducing the refrigerant from a pipeline on the suction side of the third compressor (2C) to pipelines on the suction sides of the first compressor (2A) and the second compressor (2B), and channel switching means (7b) disposed on the refrigerant pipeline (24); and the cooling/freezing operation being continued by opening the channel switching means (7b), and further, by condensing the refrigerant discharged from the first compressor (2A) and the second compressor (2B) by means of the heat source side heat exchanger (4), reducing the pressure down to a predetermined pressure lower than the first low pressure by the first expanding mechanism (42) and the second expanding mechanism (46, 52), respectively, evaporating it by the air-conditioning heat exchanger (41) and the cooling heat exchanger (45, 51), and returning it to the first compressor (2A) and the second compressor (2B) if the breakdown of the third compressor (2C) is detected during the cooling/freezing operation.

5. A refrigeration apparatus comprising:

a refrigerant circuit (1E) including first, second and third compressors (2A, 2B, 2C) connected in parallel each other, a heat source side heat exchanger (4), an air-conditioning heat exchanger (41) for air-conditioning the inside of a room, a cooling heat exchanger (45, 51) for cooling the inside of a cold store, and first and second expanding mechanisms (42, 46, 52) for expanding a refrigerant; and breakdown detecting means (80) for detecting the breakdown of at least the second compressor (2B);

the refrigeration apparatus being capable of freely performing at least a warming operation and a freezing operation, wherein the warming operation is performed by actuating the second compressor (2B) and the third compressor (2C), the warming operation being achieved by condensing a refrigerant discharged from the second compressor (2B) and the third compressor (2C) by means of the air-conditioning heat exchanger (41), expanding it by the first expanding mechanism (26), evaporating it by the heat source side heat exchanger (4), and returning it to the second compressor (2B) and the third compressor (2C), and further, the freezing operation is performed by actuating the first compressor (2A) and the second compressor (2B), the freezing operation being achieved by condensing a refrigerant discharged from the first compressor (2A) and the second compressor (2B) by means of the heat source side heat exchanger (4), expanding it by the second expanding mechanism (46, 52), evaporating it by the cooling heat exchanger (45, 51), and returning it to the first compressor (2A) and the second compressor (2B); and the warming operation being continued by actuating the first compressor (2A) in place of the second compressor (2B) if the breakdown of the second compressor (2B) is detected during the warming operation.

6. A refrigeration apparatus comprising:

a refrigerant circuit (1E) including first, second and third compressors (2A, 2B, 2C) connected in parallel each other, a heat source side heat exchanger (4), an air-conditioning heat exchanger (41) for air-conditioning the inside of a room, a cooling heat exchanger (45, 51) for cooling the inside of a cold store, and first and second expanding mechanisms (42, 46, 52) for expanding a refrigerant; and breakdown detecting means (80) for detecting the breakdown of at least the second compressor (2B);

the refrigeration apparatus being capable of freely performing at least a warming operation and a warming/freezing operation, wherein the warming operation is performed by actuating the second compressor (2B) and the third compressor (2C), the warming operation being achieved by condensing a refrigerant discharged from the second compressor (2B) and the third compressor (2C) by means of the air-conditioning heat exchanger (41), expanding it by the first expanding mechanism (42), evaporating it by the heat source side heat exchanger (4), and returning it to the second compressor (2B) and the third compressor (2C), and further, the warming/freezing operation is performed by actuating the first compressor (2A) and the second compressor (2B), the warming/freezing operation being achieved by condensing a part of a refrigerant discharged from the first compressor (2A) and the second compressor (2B) by means of the air-conditioning heat exchanger (41) while condensing the residual discharged refrigerant by means of the heat source side heat exchanger (4), expanding both of the refrigerants by the second expanding mechanism (46, 52), evaporating them by the cooling heat exchanger (45, 51), and returning them to the first compressor (2A) and the second compressor (2B);

the refrigerant circuit (1E) further including a refrigerant pipeline (23) for introducing the refrigerant from pipelines on the suction sides of the first compressor (2A) and the second compressor (2B) to a pipeline on the suction side of the third compressor (2C), and channel switching means (7a) disposed on the refrigerant pipeline (23); and the warming/freezing operation being continued by opening the channel switching means (7a), and further, actuating the third compressor (2C) in place of the second compressor (2B) if the breakdown of the second compressor (2B) is detected during the warming/freezing operation.

7. A refrigeration apparatus as claimed in any one of claims 1 to 6, wherein the cooling heat exchanger includes a refrigerating heat exchanger (45) and a freezing heat exchanger (51); and the refrigerant circuit (1E) includes an auxiliary compressor (53) disposed downstream of the freezing heat exchanger (51), for reducing the pressure of the refrigerant inside of the freezing heat exchanger (51) lower than that of the refrigerant inside of the refrigerating heat exchanger (45).

8. A refrigeration apparatus as claimed in claim 7, further comprising:

a bypass passage (59) connected at one end thereof to the discharge side of the auxiliary compressor (53) and at the other end thereof to the suction side of the auxiliary compressor (53), for allowing the refrigerant to flow in such a manner as to bypass the auxiliary compressor (53) if the auxiliary compressor (53) is broken down.

* * * * *

UNITED STATES PATENT AND TRADEMARK OFFICE
CERTIFICATE OF CORRECTION

PATENT NO. : 6,698,217 B2
DATED : March 2, 2004
INVENTOR(S) : Kenji Tanimoto et al.

It is certified that error appears in the above-identified patent and that said Letters Patent is hereby corrected as shown below:

Title page,
Item [54], Title, delete "FREEZING DEVICE" and add -- REFRIGERATION APPARATUS --.
Item [56], References Cited, FOREIGN PATENT DOCUMENTS, delete "[JP] 6-257889 A  3/2001" and add -- [JP] 6-257889 A  9/1994 -- please add -- [JP] 2001-74325 A  03/2001 --

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,698,217 B2
DATED : March 2, 2004
INVENTOR(S) : Kenji Tanimoto et al.

It is certified that error appears in the above-identified patent and that said Letters Patent is hereby corrected as shown below:

<u>Title page,</u>
Item [54], Title, delete "FREEZING DEVICE" and
add -- REFRIGERATION APPARATUS --
Item [56], References Cited, FOREIGN PATENT DOCUMENTS, delete "JP 6-257889 A   3/2001" and add -- JP 6-257889 A 9/1994 --
Please add -- JP 2001-74325 A 03/2001 --

Signed and Sealed this

Fifth Day of October, 2004

JON W. DUDAS
*Director of the United States Patent and Trademark Office*